United States Patent
Nishida et al.

(10) Patent No.: US 8,582,198 B2
(45) Date of Patent: Nov. 12, 2013

(54) INFORMATION DISPLAY PANEL

(75) Inventors: Mitsuhiro Nishida, Hino (JP); Shingo Ohno, Higashimurayama (JP); Hirotaka Yamazaki, Kunitachi (JP)

(73) Assignee: Bridgestone Corporation, Tokyo (JP)

(*) Notice: Subject to any disclaimer, the term of this patent is extended or adjusted under 35 U.S.C. 154(b) by 96 days.

(21) Appl. No.: 13/378,741

(22) PCT Filed: Jun. 9, 2010

(86) PCT No.: PCT/JP2010/003855
§ 371 (c)(1),
(2), (4) Date: Feb. 7, 2012

(87) PCT Pub. No.: WO2010/146810
PCT Pub. Date: Dec. 23, 2010

(65) Prior Publication Data
US 2012/0127561 A1    May 24, 2012

(30) Foreign Application Priority Data

Jun. 17, 2009    (JP) .................................. 2009-144520

(51) Int. Cl.
*G02B 26/00*    (2006.01)
(52) U.S. Cl.
USPC .......................................................... 359/296
(58) Field of Classification Search
USPC .......................................... 359/296; 345/107
See application file for complete search history.

(56) References Cited

U.S. PATENT DOCUMENTS 6,310,672 B1    10/2001    Koike et al.
2007/0120815 A1*    5/2007    Kita et al. ..................... 345/107

FOREIGN PATENT DOCUMENTS

| JP | 61-231586 A | 10/1986 |
| JP | 9-22031 A | 1/1997 |
| JP | 2000-194286 A | 7/2000 |
| JP | 2008-83521 A | 4/2008 |

OTHER PUBLICATIONS

International Search Report for PCT/JP2010/003855 dated Sep. 14, 2010.

* cited by examiner

*Primary Examiner* — James Jones
(74) *Attorney, Agent, or Firm* — Sughrue Mion, PLLC

(57) ABSTRACT

In an information display system panel, color filters each having respective colors are arranged to an outer surface of a transparent substrate at an observation side having a refractive index n and a thickness d, in such a manner that an overlap area between the color filter and the pixel is set in a range of 50%-100% with respect to an area of the pixel, so that a portion between adjacent color filters having different colors, which is perpendicular to a tilt visual direction, is spaced at either one of an upper and lower sides and a right and left sides of the color filter; and a relation between a visual filed displacement I indicated by following formula (1), which is generated when the image displayed by the display media is viewed as a reflected light refracted at 45° with respect to a surface of the color filter, and LS and DS denoting a pixel pitch and a pixel space along a visual direction respectively, satisfies $I \leq 0.5 \times (DS+LS)$;

$$I = d \times [\sin^2 \theta / (n^2 - \sin^2 \theta)]^{1/2} \quad \theta = 45° \qquad \text{formula (1).}$$

According to the invention, an information display panel which can prevent a color mixture with the adjacent pixel when viewed at a slant angle and can perform a color display having an excellent color reproducibility can be obtained.

7 Claims, 12 Drawing Sheets

(a)

(b)

INFORMATION DISPLAY PANEL

CROSS REFERENCE TO RELATED APPLICATIONS

This application is a National Stage of International Application No. PCT/JP2010/003855, filed on Jun. 9, 2010, which claims priority from Japanese Patent Application No. 2009-144520, filed on Jun. 17, 2009, the contents of all of which are incorporated herein by reference in their entirety.

TECHNICAL FIELD

The present invention relates to an information display panel, in which display media are sealed in a space between the substrates wherein a transparent substrate at an observation side and a rear substrate which is not necessary to be transparent are disposed oppositely, and, in which the displayed color information can be identified through color filters each having respective colors arranged on the transparent substrate at the observation side by using a light incident from the observation side, which is reflected by the display media as a reflection light. Moreover, the present invention particularly relates to an information display panel in which particles including a chargeable particle are used as the display media and having a construction such that display pixels are disposed in a matrix manner.

RELATED ART

As an information display apparatus alternative to a liquid crystal device (LCD), various information display apparatuses having an excellent visibility like viewing a paper by using a technique, in which a reflection light reflected by the particles constituting the display media, are proposed: such as an apparatus of fly and move type in which the chargeable particles are flied and moved in an aerial space (including a vapor state) so as to see them; an electrophoresis apparatus in which the chargeable particles are moved in a liquid so as to see them; and an apparatus of two-color particle rotating type in which a chargeable particle constituted by two colors are rotated in a liquid to see them. These techniques have merits, as compared with the known LCD; such that a wide view angle substantially same as that of an ordinary printed matter can be obtained; and, such that a low power consumption panel can be realized since it is necessary supply power only when rewriting information due to its display memory property. Therefore, these techniques are thought to be an technique which can be used for an information display device of the next generation, and thus expect an development for an information display device for a mobile terminal, an information display device of an electric paper type and so on. Particularly, in recent days, a capsule electrophoresis type panel in which the chargeable particles are sealed in a micro capsule together with a dispersion liquid as a dispersion particle and the micro capsules are disposed between the opposed substrates; and a charged particle moving in a gas type panel in which the display media constituted by the particles including a chargeable particle are sealed in a cell formed between the opposed substrates in which cell a gaseous state or a vapor state is maintained; are proposed and their expectations are raised.

Among them, it is known an information display panel, in which at least two groups of display media constituted by chargeable particles having different optical reflectance and different charging characteristics are sealed in a gaseous space or in a vacuum space between the substrates in which two substrates with a conductive layer, at least one of the substrates being transparent, and, in which the display media are moved by applying an electric field between the substrates so as to display information.

Moreover, it is known a color display type information display panel, in which color filters each having respective colors and an area smaller than that of a pixel are arranged on an outer surface of the panel substrate corresponding to the pixel, in the information display panel, in which at least two groups of display media constituted by chargeable particles having different optical reflectance and different charging characteristics are sealed in a gaseous space or in a vacuum space between the substrates in which two substrates with a conductive layer, at least one of the substrates being transparent, and, in which the display media are moved by applying an electric field between the substrates so as to display information (for example, refer to patent document 1).

PRIOR ART DOCUMENTS

Patent Documents

Patent document 1: Japanese Patent Laid-Open Publication No. 2008-83521

SUMMARY OF THE INVENTION

Tasks to be Solved by the Invention

In the information display panel using the color filter disclosed in the patent document 1 mentioned above, the transparent substrate with the transparent electrode is prepared and the color filters (red color: R, green color: G, blue color; B) are disposed to a surface opposed to the surface of the substrate on which the electrode is formed, so as to avoid a color mixture even when viewed by a slant angle. However, since use is made of a general glass substrate having a thickness not less than 700 μm as the transparent substrate of the information display panel, it is not possible to avoid a problem of the color mixture generated when viewed by a slant angle mentioned above, if an area of respective color filters is set to an area smaller than that of the pixel. In this case, there is a drawback such that a desired color of the color filters can not be obtained even when viewed squarely with respect to the panel, since an area of the color filters is too small, and thus color reproducibility becomes low.

In the information display panel using the color filter disclosed in the patent document 1 mentioned above, when a size of the color filter is indicated, a size of the pixel and a thickness of the transparent substrate are not considered. Therefore, even if the size of the color filter is made smaller with respect to the size of the pixel, there occurs a color mixture when viewed by a slant angle in the case of using a thick transparent substrate.

Actually, in the information display panel using the color filter disclosed in the patent document 1 mentioned above, a color mixture when viewed by a slant angle is made difficult to occur, by making the size of the color filter extraordinarily small and by making an interval between respective color filters (R, G, B) sufficient. On the contrary, if the size of the color filter is made too small, there is a drawback such that the displayed image becomes vague and is not sharp when viewed squarely.

An object of the invention is to eliminate the drawbacks mentioned above and to provide an information display panel which can prevent a color mixture with the adjacent pixel when viewed at a slant angle and can perform a color display having an excellent color reproducibility.

Means for Solving the Task

According to the invention, an information display panel, in which display media are sealed in a space between the substrates wherein a transparent substrate at an observation side and a rear substrate which is not necessary to be transparent are disposed oppositely, and, in which the displayed color information can be identified through color filters each having respective colors arranged on the transparent substrate at the observation side by using a light incident from the observation side, which is reflected by the display media as a reflection light, is characterized in that color filters each having respective colors are arranged to an outer surface of a transparent substrate at an observation side having a refractive index n and a thickness d, in such a manner that an overlap area between the color filter and the pixel is set in a range of 50%-100% with respect to an area of the pixel, so that a portion between adjacent color filters having different colors, which is perpendicular to a tilt visual direction, is spaced at either one of an upper and lower sides and a right and left sides of the color filter; and a relation between a visual filed displacement I indicated by following formula (1), which is generated when the image displayed by the display media is viewed as a reflected light refracted at 45° with respect to a surface of the color filter, and LS and DS denoting a pixel pitch and a pixel space along a visual direction respectively, satisfies I≤0.5×(DS+LS);

$$I=d\times[\sin^2\theta/(n^2-\sin^2\theta)]^{1/2} \quad \theta=45° \qquad \text{formula (1).}$$

As preferred embodiments of the information display panel according to the invention, there are cases: that a relation between the visual field displacement I indicated by said formula (1), which is generated when the image displayed by the display media is viewed as the reflected light refracted at 45° with respect to a surface of the color filter, and a space t generated between the color filter and the pixel, satisfies I≤DS+t; that a patterned transparent conductive layer or a solid transparent conductive layer is formed on one surface of the transparent substrate and the color filters having a respective color are arranged to a surface opposite to a surface on which said patterned or solid conductive film is formed; that a thickness d of the transparent substrate at the observation side is not more than 200 μm and a refractive index n of the transparent substrate at the observation side is not less than 1.47; that a material of the transparent substrate at the observation side is either one of glass, polyethylene terephthalate (PET), polyethylene naphthalate (PEN), triacetylcellulose (TAC), polycarbonate (PC), and acetyl group resin; that the color filters are constructed by either one of color filters having three primary colors or color filters having three primary colors and one transparent filter; and that, as the display media sealed between the transparent substrate at the observation side on which the color filters are arranged and the other substrate at the rear side, use is made of particles including a particle having at least optical reflectance and charging characteristics so as to display image by moving the display media by means of an electric field formed between the substrates.

Effect of the Invention

According to the invention, since, the color filters each having respective colors are arranged to an outer surface of a transparent substrate at an observation side having a refractive index n and a thickness d, in such a manner that an overlap area between the color filter and the pixel is set in a range of 50%-100% with respect to an area of the pixel, so that a portion between adjacent color filters having different colors, which is perpendicular to a tilt visual direction, is spaced at either one of an upper and lower sides and a right and left sides of the color filter; and a relation between a visual filed displacement I indicated by following formula (1), which is generated when the image displayed by the display media is viewed as a reflected light refracted at 45° with respect to a surface of the color filter, and LS and DS denoting a pixel pitch and a pixel space along a visual direction respectively, satisfies I≤0.5×(DS+LS), $I=d\times[\sin^2\theta/(n^2-\sin^2\theta)]^{1/2}$ θ=45° formula (1); it is possible to obtain an information display panel which can prevent a color mixture with the adjacent pixel when viewed at a slant angle and can perform a color display having an excellent color reproducibility.

Moreover, in the case that a relation between the visual field displacement I indicated by said formula (1), which is generated when the image displayed by the display media is viewed as the reflected light refracted at 45° with respect to a surface of the color filter, and a space t generated between the color filter and the pixel, satisfies I≤DS+t, a color mixture between adjacent color filters may be prevented more effectively.

Further, in the case that a thickness d of the transparent substrate at the observation side is not more than 200 μm and a refractive index n of the transparent substrate at the observation side is not less than 1.47, it is possible to optimize a size of the color filters corresponding to a size of the pixel, to prevent a color mixture with the adjacent pixel when viewed from a tilt direction effectively, and to obtain an information display panel which can excellent color display with a high color reproductively.

Furthermore, in the case that a material of the transparent substrate at the observation side is either one of glass, polyethylene terephthalate (PET), polyethylene naphthalate (PEN), triacetylcellulose (TAC), polycarbonate (PC), and acetyl group resin, and in the case that the color filters are constructed by either one of color filters having three primary colors or color filters having three primary colors and one transparent filter, it is possible to achieve a suitable color display which is matched with the object of the information display panel.

Moreover, in the case that, as the display media sealed between the transparent substrate at the observation side on which the color filters are arranged and the other substrate at the rear side, use is made of particles including a particle having at least optical reflectance and charging characteristics so as to display image by moving the display media by means of an electric field formed between the substrates, it is possible to optimize a structure of the information display panel according to the invention, since the viewed light is a reflected light with respect to the display media moved to the transparent substrate at the observation side, to prevent a color mixture with the adjacent pixel when viewed from a tilt direction effectively, and to obtain an information display panel which can excellent color display with a high color reproductively.

BRIEF DESCRIPTION OF THE DRAWINGS

FIGS. 1a and 1b are schematic views respectively showing one embodiment of a principle structure of an information display panel according to the invention.

FIGS. 2a and 3b are schematic views respectively illustrating another embodiment of the principle structure of the information display panel according to the invention.

FIGS. 3a and 3b are schematic views respectively depicting still another embodiment of the principle structure of the information display panel according to the invention.

FIG. 4 is a schematic view explaining a relation for preventing a color mixture when viewed from a tilt direction, which is a feature of the information display panel according to the invention.

FIGS. 5a and 5b are schematic views respectively explaining one embodiment of a method of forming color filters in the information display panel according to the invention.

FIGS. 6a and 6b are schematic views respectively explaining a relation of area with respect to a pixel of the color filters, which is another feature of the information display panel according to the invention.

FIG. 7 is a schematic view explaining one embodiment of the information display panel according to the invention, in which dot-shaped color filters are formed by an ink-jet printing method.

FIG. 8 is a schematic view explaining one embodiment of the information display panel according to the invention, in which stripe-shaped color filters are formed by a flexographic printing method.

FIG. 9 is a schematic view explaining another embodiment of the information display panel according to the invention, in which dot-shaped color filters are formed by an ink-jet printing method.

FIG. 10 is a schematic view explaining another embodiment of the information display panel according to the invention, in which stripe-shaped color filters are formed by a flexographic printing method.

FIGS. 11a and 11b are schematic views respectively showing one embodiment of an arrangement of the color filters with respect to the pixel of the information display panel according to the invention.

FIGS. 12a and 12b are schematic views respectively illustrating another embodiment of an arrangement of the color filters with respect to the pixel of the information display panel according to the invention.

DESCRIPTION OF THE PREFERRED EMBODIMENTS

Figure 1:
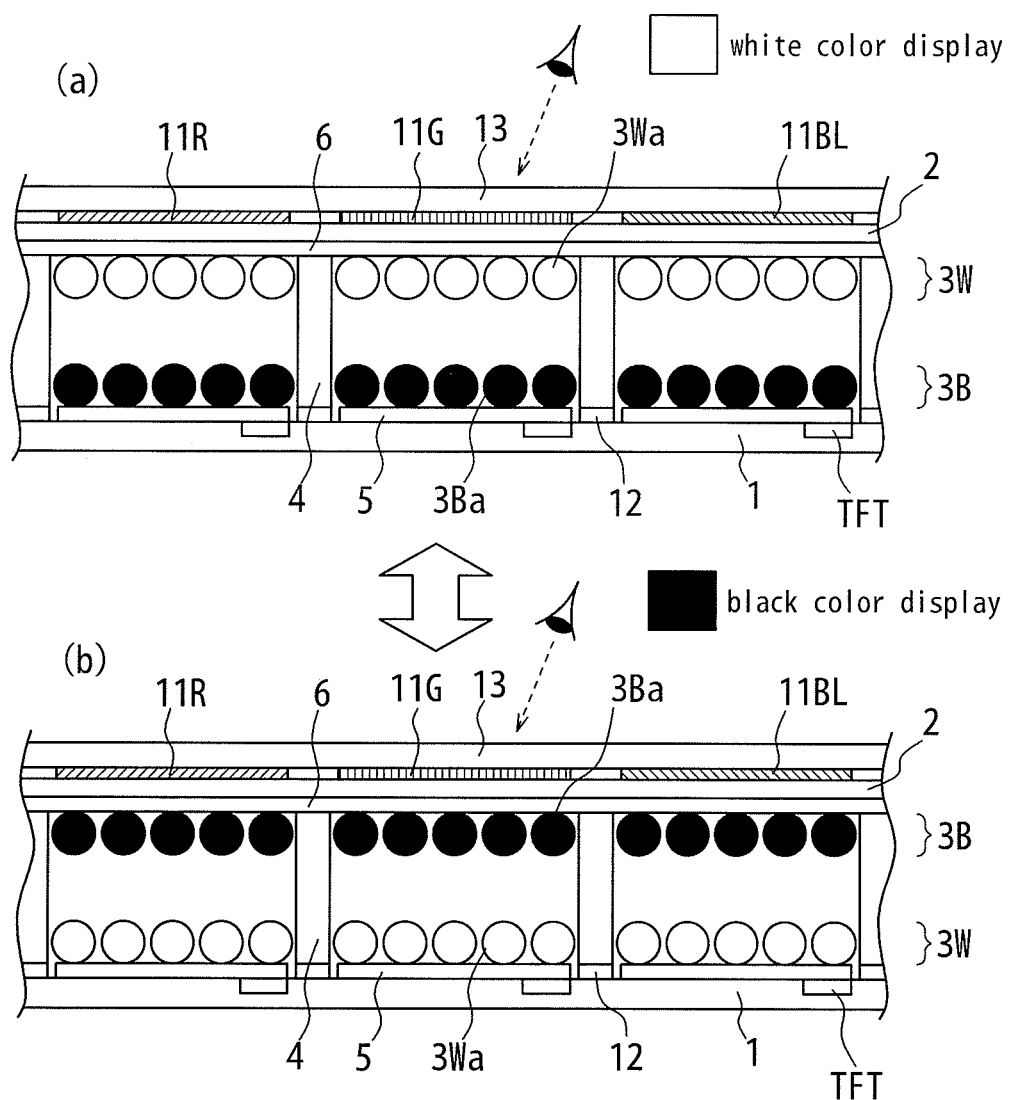
[FIG. 1]
Figure 2:
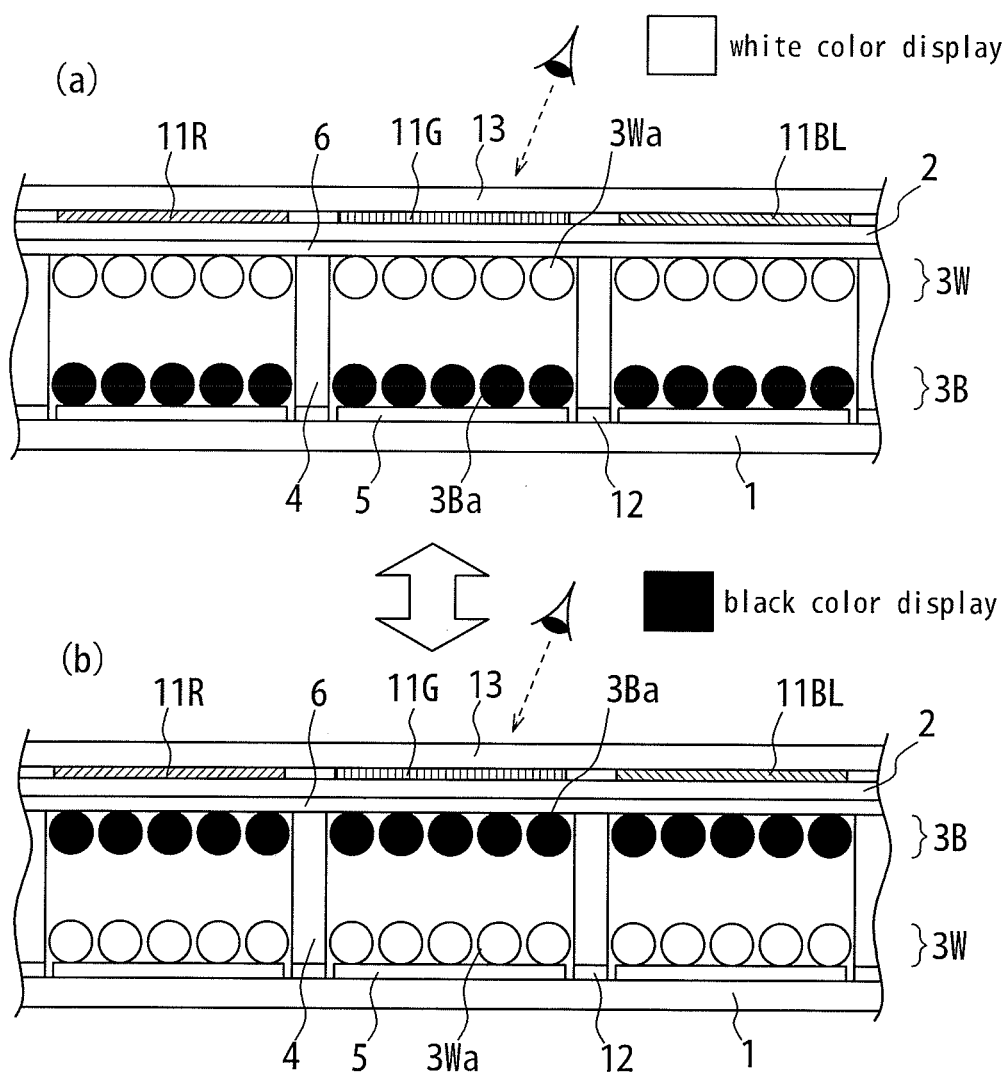
[FIG. 2]

At first, among the information display panels according to the invention, one embodiment of an information display panel, in which particles including a charged particle are used as display media, will be explained. In the information display panel, an electric field is applied to the display media sealed in the space between two opposed substrates. Along a direction of the applied electric field, by means of the force of the electrostatic field, Coulomb's force or the like, the charged display media are attracted and moved by varying a direction of electrostatic field. Accordingly, information such as an image or the like can be displayed. Therefore, it is necessary to design the information display panel in such a manner that the display media can move evenly and maintain stability during a reciprocal operation or during a reserving state. Here, as to forces applied to the particles constituting display media, there are an attraction force between the particles due to Coulomb' force, an imaging force with respect to the electrodes or substrates, an intermolecular force, a liquid bonding force, a gravity and the like.

Among the information display panels which are an object of the invention, examples of the information display panel using the particles including the charged particle as the display media will be explained with reference to FIGS. 1a and 1b to FIGS. 3a and 3b.

In the examples shown in FIGS. 1a and 1b, at least two or more groups of display media having different optical reflectance and different charging properties and consisting of particles having at least different optical reflectance and different charging properties (here, white color display media 3W made of the particles including negatively charging white color display particle 3Wa and black color display media 3B made of the particles including positively charging black color display particle 3Ba are shown) are moved in respective cells formed by partition walls 4, in a perpendicular direction with respect to substrates 1 and 2, in accordance with an electric field generated by applying a voltage between a pair of pixel electrodes constituted by opposing an electrode 5 (pixel electrode having TFT) arranged to the substrate 1 and an electrode 6 (common electrode) arranged to the substrate 2. A red color filter 11R, a green color filter 11G and a blue color filter 11BL are arranged to an outer surface of the transparent substrate 2 at an observation side corresponding to respective pixels, and a protection layer 13 is arranged on these color filters. Here, the pixels and the cells correspond one by one, and the red color filter 11R, the green color filter 11G and the blue color filter 11BL are formed correspondingly with respect to the respective pixels, so that a display is performed by using three RGB pixels as one display unit.

Then, a white color is displayed in such a manner that mixed lights transmitted through the red color filter 11R, the green color filter 11G and the blue color filter 11BL are viewed to an observer by moving the white color display media 3W to an observation side as shown in FIG. 1a, or, a black color is displayed by moving the black color display media 3B to an observation side as shown in FIG. 1b. In this case, a dot matrix display is performed by arranging the pixel electrode pairs and the cells one by one in a matrix manner. Moreover, in FIGS. 1a and 1b, the partition walls arranged at the near side are omitted.

In the examples shown in FIGS. 2a and 2b, at least two or more groups of display media having different optical reflectance and different charging properties and consisting of particles having at least different optical reflectance and different charging properties (here, white color display media 3W made of the particles including negatively charging white color display particle 3Wa and black color display media 3B made of the particles including positively charging black color display particle 3Ba are shown) are moved in respective cells formed by partition walls 4, in a perpendicular direction with respect to substrates 1 and 2, in accordance with an electric field generated by applying a voltage between a pair of pixel electrodes constituted by opposing an electrode 5 (stripe electrode) arranged to the substrate 1 and an electrode 6 (stripe electrode) arranged to the substrate 2. A red color filter 11R, a green color filter 11G and a blue color filter 11BL are arranged to an outer surface of the transparent substrate 2 at an observation side corresponding to respective pixels, and a protection layer 13 is arranged on these color filters. Here, the pixels and the cells correspond one by one, and the red color filter 11R, the green color filter 11G and the blue color filter 11BL are formed correspondingly with respect to the respective pixels, so that a display is performed by using three RGB pixels as one display unit.

Then, a white color is displayed in such a manner that mixed lights transmitted through the red color filter 11R, the green color filter 11G and the blue color filter 11BL are viewed to an observer by moving the white color display media 3W to an observation side as shown in FIG. 2a, or, a black color is displayed by moving the black color display media 3B to an observation side as shown in FIG. 2b. In this case, a dot matrix display is performed by arranging the pixel electrode pairs and the cells one by one in a matrix manner. Moreover, in FIGS. 2a and 2b, the partition walls arranged at the near side are omitted.

Figure 3:
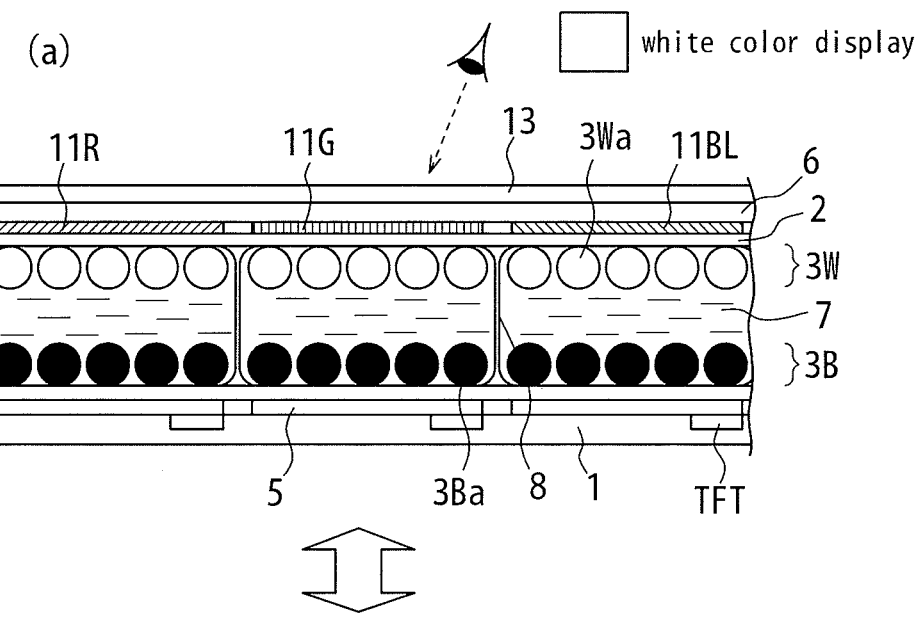
[FIG. 3]
Figure 3:
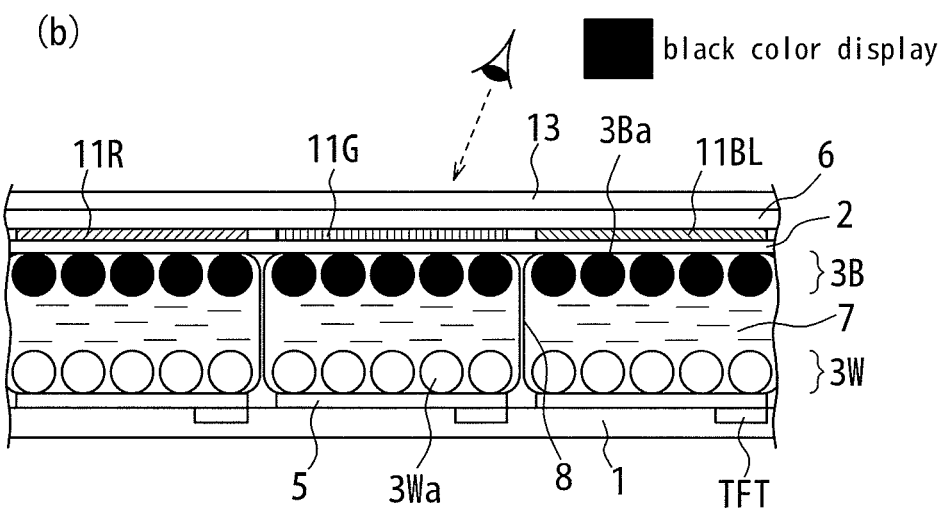

Moreover, in this embodiment, the explanation is made to the information display panel of a charged particle moving in gas type, in which a cell space is filled with gas (for example, air), but use may be made of an information display panel, in which a cell space is in a vacuum state, or an information display panel of a charged particle moving in liquid type (electrophoresis method), in which use is made of an insulation liquid instead of gas. In this case, as shown in FIG. 3, use may be made of an information display panel of a charged particle are sealed in a capsule 8 together with an insulation liquid 7 as the display media 3W and 3B.

In the embodiments shown in FIGS. 1a and 1b to FIGS. 3a and 3b, as a method of arranging the color filters (11R, 11G, 11BL) to the transparent substrate at the observation side, use may be made of a method, in which the color filters may be formed on the transparent protection film 13 and then they may be arranged on the transparent substrate 2 at an observation side through a transparent adhesive layer, or, a method, in which the color filters may be formed on the transparent substrate 2 at an observation side and then the transparent film with an adhesive may be formed on the color filters through an adhesive so as to arranged the protection film 13.

The feature of the information display panel according to the invention is as follows. That is to say, in the information display panel having the construction mentioned above, color filters each having respective colors are arranged to an outer surface of a transparent substrate at an observation side having a refractive index n and a thickness d, in such a manner that an overlap area between the color filter and the pixel is set in a range of 50%-100% with respect to an area of the pixel, so that a portion between adjacent color filters having different colors, which is perpendicular to a tilt visual direction, is spaced at either one of an upper and lower sides and a right and left sides of the color filter, and a relation between a visual filed displacement I indicated by following formula (1), which is generated when the image displayed by the display media is viewed as a reflected light refracted at 45° with respect to a surface of the color filter, and LS and DS denoting a pixel pitch and a pixel space along a visual direction respectively, satisfies I≤0.5×(DS+LS);

$$I=d\times[\sin^2\theta/(n^2-\sin^2\theta)]^{1/2} \quad \theta=45° \qquad \text{formula (1).}$$

Figure 4:
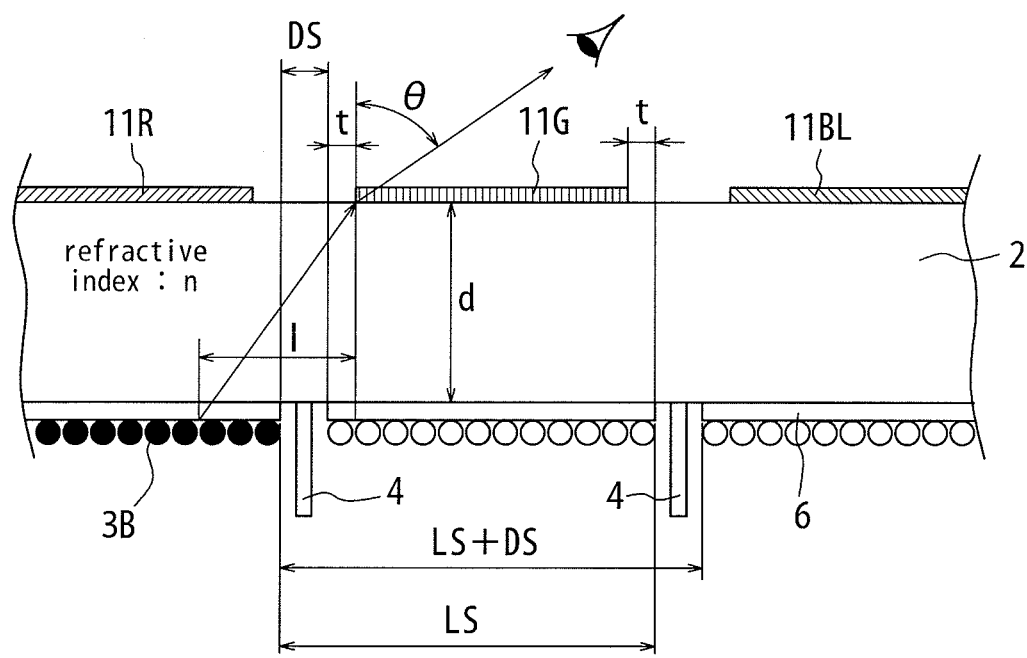
[FIG. 4]

FIG. 4 is a schematic view explaining a color mixture generated when viewed from a tilt direction with respect to the color filters each having respective colors since the color filters are arranged to an outer surface of the transparent substrate at an observation side having a refractive index of n and a thickness of d, which is one of the features of the information display panel according to the invention. In the embodiment shown in FIG. 4, portions similar to those illustrated in FIGS. 1a and 1b to FIGS. 3a and 3b are denoted by the same reference numerals, and the explanations thereof are omitted here. In the embodiment shown in FIG. 4, an arrow illustrated in FIG. 4 shows a region where a reflected light from the display media (here, black color particles) existing in the pixel corresponding to the red color filter 11R is through the green color filter 11G when viewed in a tilt direction having a tilt angle θ. Moreover, FIG. 4 is a schematic view showing a state such that a reflected light transmitted through the transparent substrate at an observation side is refracted at a boundary between the green color filter 11G and the transparent substrate 2 at an observation side and then propagates along θ direction. Actually, the viewer sees the reflected light propagating after refracted at a boundary between the transparent electrode and the transparent substrate at an observation side or a boundary between the color filter and the protection layer. However, since a thickness of the transparent electrode and a thickness of the color filter are extremely thin as compared with a thickness of the transparent substrate 2 at an observation side, a deviation due to refraction is an ignorable size. Therefore, in this embodiment, only the refraction at the boundary between the transparent substrate 2 at an observation side and the color filter is thought about. In this case, the protection layer is not thought about and an outer environment at an observation side is an air layer (refractive index 1). Therefore, a refracted direction when a refractive index n is larger than 1 is shown. In addition, even in the case such that the protection layer is arranged between the color filter and the air layer, the same relation between the reflected light from the display media and the light direction observed by refracting the reflected light at the boundary is indicated.

In the embodiment shown in FIG. 4, in the case that the transparent substrate 2 at an observation side is formed by a material having a larger refractive index (n), it is possible to prevent a color mixture correspondingly, even if a distance between adjacent color filters each having a different color. A distance from a surface of the display media (particles) to a surface of the color filter is indicated by a sum of a thickness d of the transparent substrate and a thickness of the transparent conductive film. In this case, since a thickness of the transparent conductive film is substantially several hundreds nm, it is possible to think that the distance between a surface of the display media and a surface of the color filter is the same thickness d as that of the transparent substrate at an observation side, which is several tens μm to several hundreds μm. Moreover, in the embodiment shown in FIG. 4, t is a length of a portion where the pixel and the color filter are not overlapped. In this figure, a length t arranged at right and left sides with respect to the color filter may be the same length, or may be a different length. However, if use is made of the information display panel which views from a tilt direction of both right and left (or up and down), it is preferred to set the length t of right and the length t of left to the same length. Further, when viewed from a tilt direction, a pixel space along a visual direction is assumed to be DS and a pixel pitch is assumed to be LS. The partition walls forming the cell are arranged to the pixel space, and a width of the partition wall is set to be not more than DS. Here, an example such that a width of the partition wall is narrower than the pixel space DS is shown.

In the embodiment shown in FIG. 4, since there is a visual field displacement I indicated by $I=d\times[\sin^2\theta/(n^2-\sin^2\theta)]^{1/2}$ when viewed from a tilt θ direction, a color recognized through the green color filter becomes a color generated from the reflected light from the display media (particles) existing in the pixel for green color display, which is mixed with the reflected light from the adjacent pixel for red color display due to the visual field displacement I mentioned above. That is to say, the color recognized through the green color filter becomes a color mixture. The visual field displacement I can be made small if a thickness d of the transparent substrate corresponding to a distance between a surface of the display media and a surface of the color filter is made smaller and a refractive index n is made larger. Then, if the pixel space DS and the space t between the color filter and the pixel are made larger, the color mixture due to the reflected light from the display media (particles) existing in adjacent pixel for another color display can be smaller. However, if DS is made larger with respect to a pixel length (LS−DS), a space between the pixels becomes large and clear image cannot be obtained.

Moreover, if the space t between the color filter and the pixel is made larger with respect to the pixel length (LS–DS), an area of the color filter becomes too small with respect to an area of the pixel and thus clear image cannot be obtained. In the present invention, if an area of the color filter is set to not less than 50% and not more than 100% with respect to an area of the pixel, and, if a relation of DS mentioned above, LS mentioned above, refractive index n of the transparent substrate at an observation side and distance from a surface of the display media to a surface of the color filter i.e. substantively thickness d of the transparent substrate, on the basis of the visual field displacement I $(\theta=45°)=d\times[\sin^2 \theta/(n^2-\sin^2 \theta)]^{1/2}=d\times[0.5/(n^2-0.5)]^{1/2}$ when viewed from 45° tilt direction, is set to satisfy $I\leq0.5\times(DS+LS)$, it is found that a color mixture of the whole information display panel can be prevented even when viewed from a direction range of at least −45° tilt~front~+45° tilt, as is clearly understood from examples mentioned below.

Figure 5:
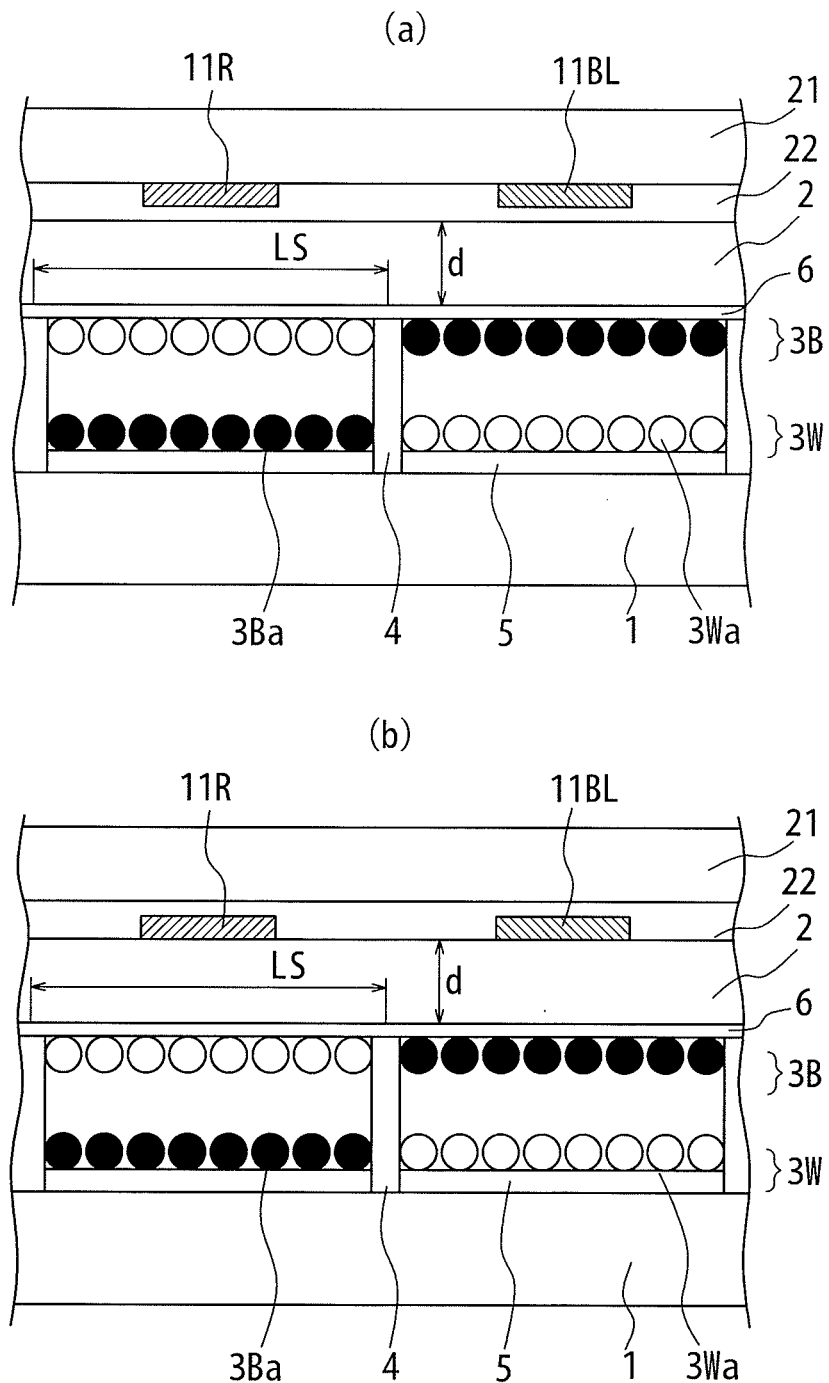
[FIG. 5]

FIGS. 5a and 5b are schematic views respectively explaining one embodiment of a method of forming color filters in the information display panel according to the invention. In the embodiment shown in FIG. 5a, a transparent protection film 21, to which the color filters are formed, is arranged to an outer surface of the transparent substrate 2 at an observation side by means of a transparent adhesive agent 22. In this case, a distance from a surface of the display media (particles) to a surface of the color filter is indicated by a sum of a thickness d of the transparent substrate, a thickness of the transparent conductive layer and a thickness of the transparent adhesive agent on the color filters. Since a thickness of the transparent conductive film is several hundreds nm and a thickness of the transparent adhesive agent on the color filters is several hundreds nm, it is possible to think that a distance from a surface of the display media to a surface of the color filter is substantively same as a thickness d of the transparent substrate at an observation side, which is a range of several tens μm to several hundreds μm. In the embodiment shown in FIG. 5b, the color filters are formed to an outer surface of the transparent substrate 2 at an observation side, and then the transparent protection film 21 is arranged thereto by means of the transparent adhesive agent 22. In this case, a distance from a surface of the display media (particles) to a surface of the color filter is indicated by a sum of a thickness d of the transparent substrate and a thickness of the transparent conductive layer. Since a thickness of the transparent adhesive agent on the color filters excludes a distance from a surface of the display media to a surface of the color filters and a thickness of the transparent conductive film is several hundreds nm, it is possible to think that a distance from a surface of the display media to a surface of the color filter is substantively same as a thickness d of the transparent substrate at an observation side, which is a range of several tens μm to several hundreds μm.

Figure 6:
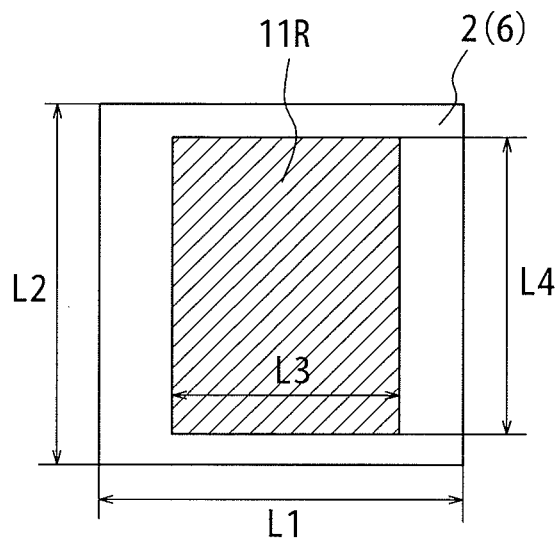
[FIG. 6]
Figure 6:
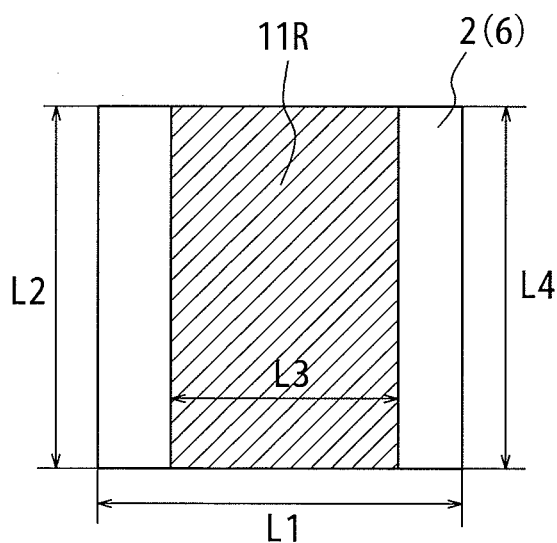

FIGS. 6a and 6b are schematic views respectively explaining a relation of an area of the color filter with respect to an area of the pixel, which is another feature of the information display panel according to the invention. FIGS. 6a and 6b show respectively an arrangement when spaces to adjacent color filters are arranged at both sides of at least one color filter. In FIG. 6a, the spaces mentioned above are arranged at both of right and left sides and at both of up and down sides. In FIG. 6b, the spaces mentioned above are arranged only at both of right and left sides. In this embodiment, lengths of the pixel are assumed as L1 and L2, and lengths of for example red color filter 11R are assumed as L3 and L4. In this case, a percentage of an area of the color filter with respect to an area of the pixel can be obtained by $[(L3\times L4)/(L1\times L2)]\times100(\%)$.

As is clearly understood from the examples mentioned below, if this calculated value exceeds 50%, it is understood that a color image having an excellent clearness is displayed.

Then, one arrangement of the color filters in the information display panel according to the invention having the construction mentioned above will be explained on the basis of FIGS. 7 to 10. The information display panel according to the invention can be preferably used in any color filter arrangements shown in FIGS. 7 to 10. In FIGS. 7 to 10, LL is an arrangement pitch of the pixel (along a lengthwise side direction), and LS is an arrangement pitch of the pixel (along a narrow side direction).

Figure 7:
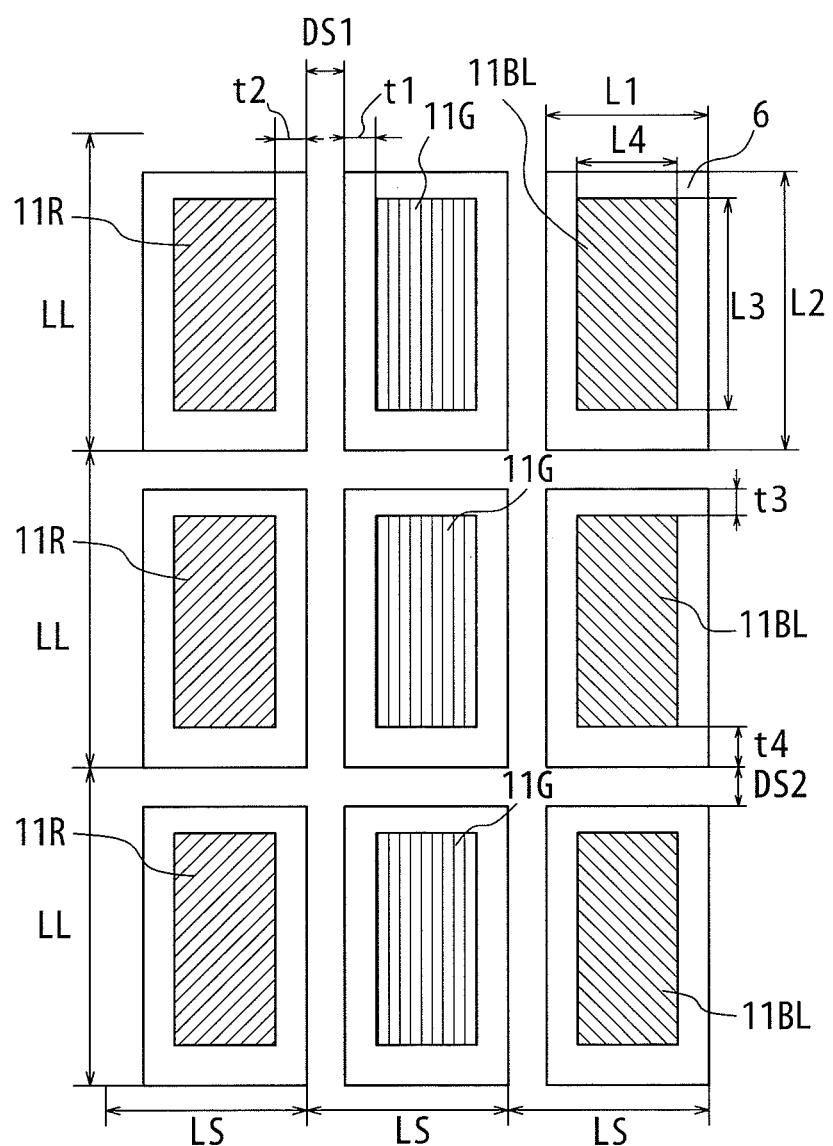
[FIG. 7]

FIG. 7 is a schematic view explaining one embodiment of the information display panel according to the invention, in which three color filters each having a dotted shape (11R, 11G, 11BL) are formed by using an ink jet printing. In the embodiment shown in FIG. 7, conditions for achieving the information display panel, which obtains an excellent color display even when viewed from a tilt direction of right and left sides and also viewed from a front direction, are as follows. That is to say, the space DS (dot space) between the pixel and the pixel is DS1 shown in FIG. 7, and the pixel pitch LS is LS shown in FIG. 7. Widths of t1 and t2 may be the same width and may be a different width. Moreover, conditions for achieving the information display panel, which obtains an excellent color display even when viewed from a tilt direction of up and down sides and also viewed from a front direction, are as follows. That is to say, the space DS between the pixel and the pixel is DS2 shown in FIG. 7, and the pixel pitch LS is LL shown in FIG. 7. Widths of t3 and t4 may be the same width and may be a different width. In both cases, it is necessary to satisfy a condition of the visual field displacement I of $I\leq0.5\times(DS+LS)$.

Figure 8:
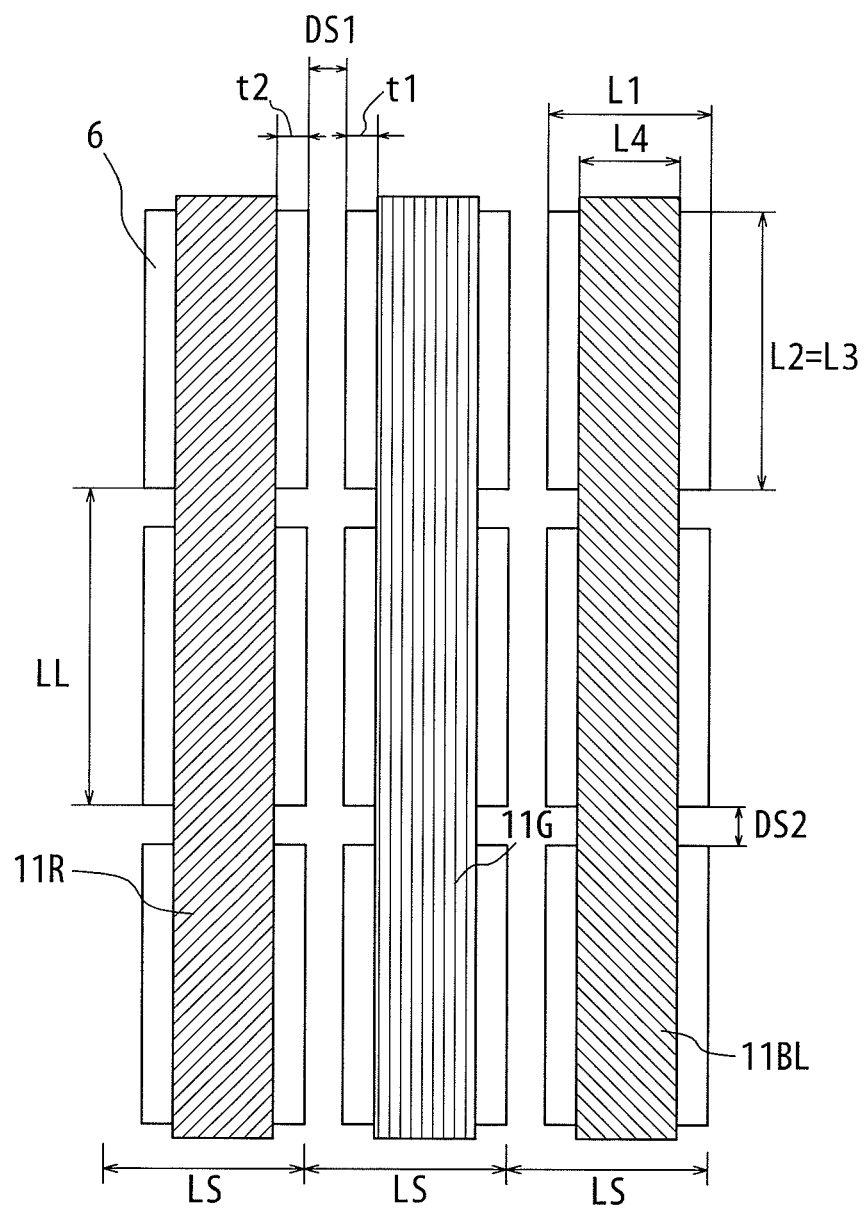
[FIG. 8]

FIG. 8 is a schematic view explaining one embodiment of the information display panel according to the invention, in which three color filters each having a dotted shape (11R, 11G, 11BL) are formed by using a flexographic printing. In the embodiment shown in FIG. 8, conditions for achieving the information display panel, which obtains an excellent color display even when viewed from a tilt direction of right and left sides and also viewed from a front direction, are as follows. That is to say, the space DS (dot space) between the pixel and the pixel is DS1 shown in FIG. 8, and the pixel pitch LS is LS shown in FIG. 8. Widths of t1 and t2 may be the same width and may be a different width. In the embodiment shown in FIG. 8, it is possible to achieve the information display panel which obtains an excellent color display, since the same color filters are arranged to the adjacent pixels even when viewed from a tilt direction of up and down sides. In this embodiment, the space DS (dot space) between the pixel and the pixel is DS2 shown in FIG. 8, and the pixel pitch LS is LL shown in FIG. 8. Both of t3 and t4 may be zero.

Figure 9:
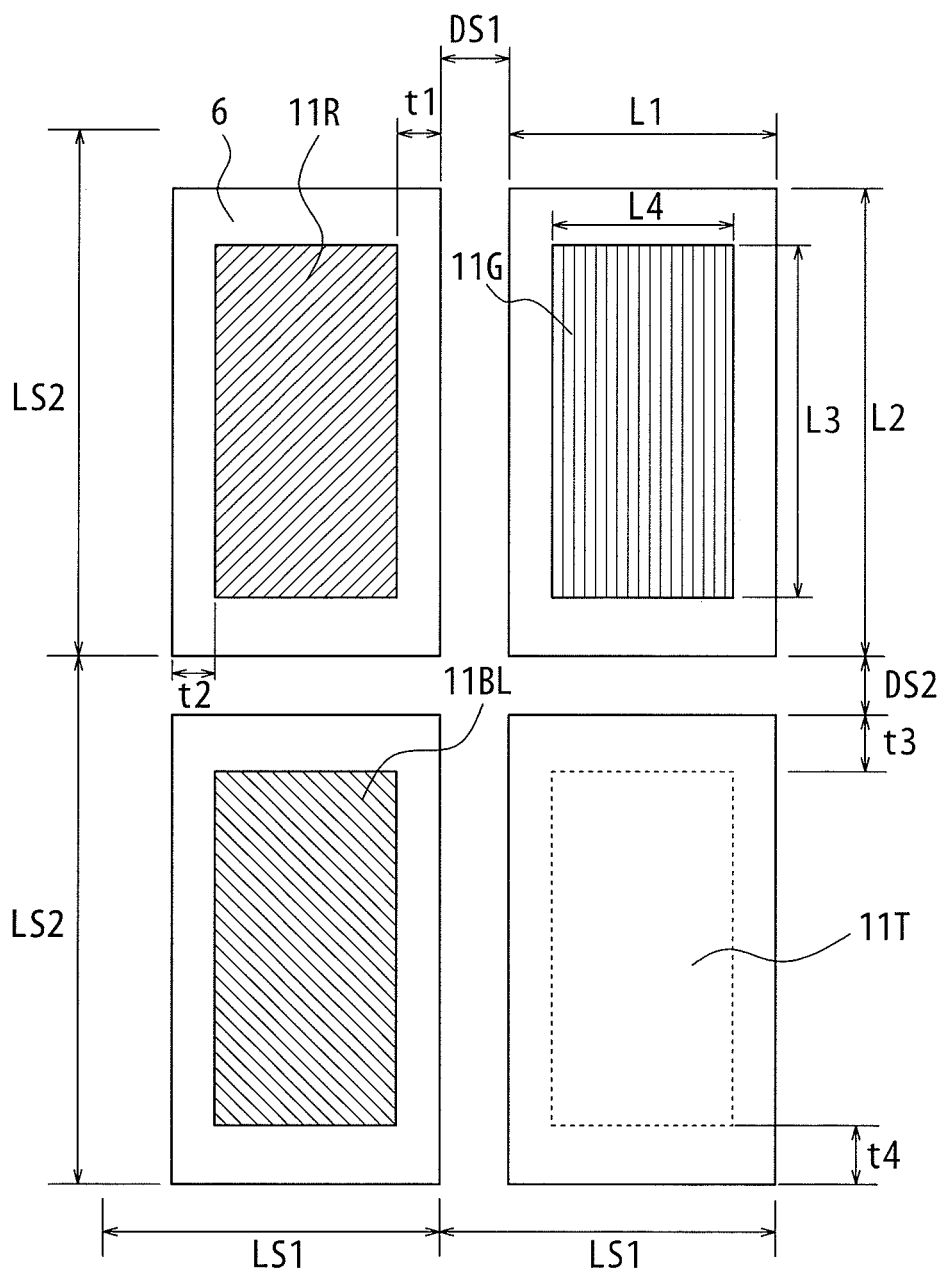
[FIG. 9]

FIG. 9 is a schematic view explaining another embodiment of the information display panel according to the invention, in which four color filters each having a dotted square shape (11R, 11G, 11BL, 11T) are formed by using an ink jet printing. In the embodiment shown in FIG. 9, conditions for achieving the information display panel, which obtains an excellent color display even when viewed from a tilt direction of right and left sides and also viewed from a front direction, are as follows. That is to say, the space DS (dot space) between the pixel and the pixel is DS1 shown in FIG. 9, and the pixel pitch LS is LS1 shown in FIG. 9. Moreover, conditions for achieving the information display panel, which obtains an excellent color display even when viewed from a tilt direction of up and down sides and also viewed from a front direction, are as follows. That is to say, the space DS (dot space) between the pixel and the pixel is DS2 shown in FIG. 9, and the pixel pitch LS is LS2 shown in FIG. 9. In both cases, it is necessary to satisfy a condition of the visual field displacement I of I≤0.5×(DS+LS). Widths of t1 and t2 may be the same width and may be a different width. Widths of t3 and t4 may be also the same width and may be a different width.

Figure 10:
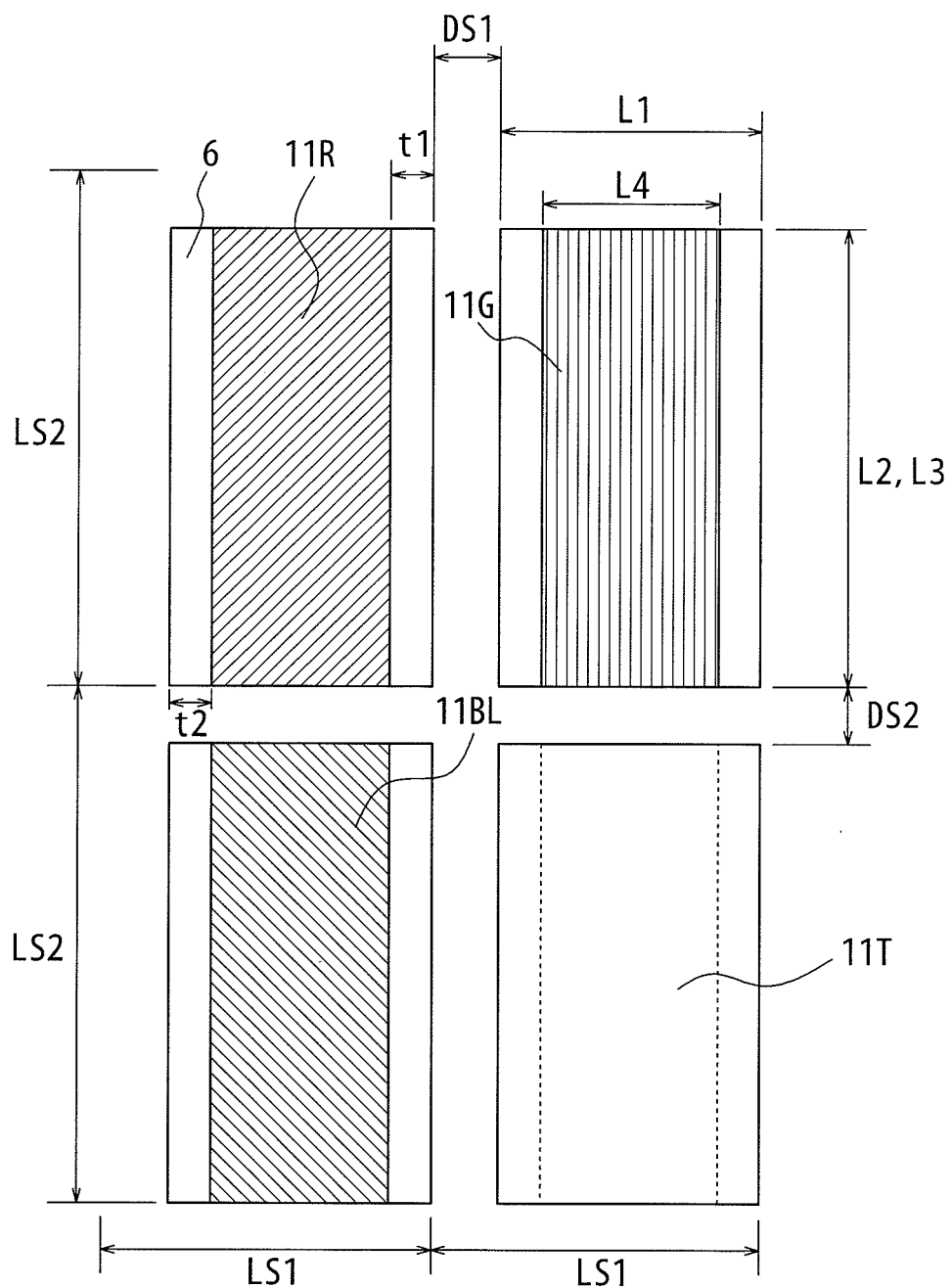
[FIG. 10]

FIG. 10 is a schematic view explaining still another embodiment of the information display panel according to the invention, in which four color filters each having a dotted square shape (11R, 11G, 11BL, 11T) are formed by using an ink jet printing. In the embodiment shown in FIG. 10, conditions for achieving the information display panel, which obtains an excellent color display even when viewed from a tilt direction of right and left sides and also viewed from a front direction, are as follows. That is to say, the space DS (dot space) between the pixel and the pixel is DS1 shown in FIG. 10, and the pixel pitch LS is LS1 shown in FIG. 10. Moreover, conditions for achieving the information display panel, which obtains an excellent color display even when viewed from a tilt direction of up and down sides and also viewed from a front direction, are as follows. That is to say, the space DS (dot space) between the pixel and the pixel is DS2 shown in FIG. 10, and the pixel pitch LS is LS2 shown in FIG. 10. In both cases, it is necessary to satisfy a condition of the visual field displacement I of I≤0.5×(DS+LS). As compared with the embodiment shown in FIG. 9, it is a different point such that there is no interval t between the color filter and the pixel along up and down directions. That is to say, widths of t3 and t4 are zero. Widths of t1 and t2 may be the same width and may be a different width.

Figure 11:
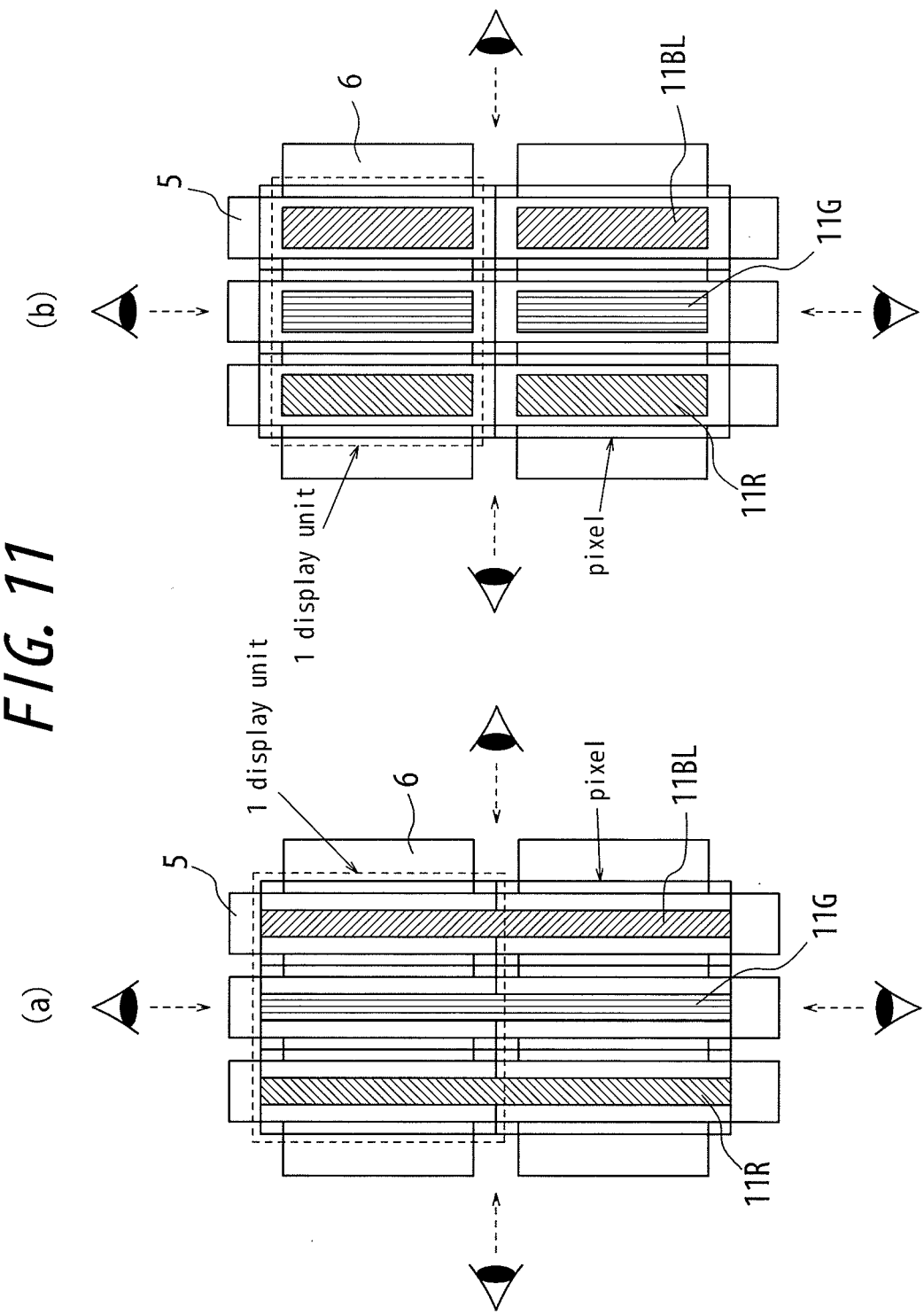
[FIG. 11]
Figure 12:
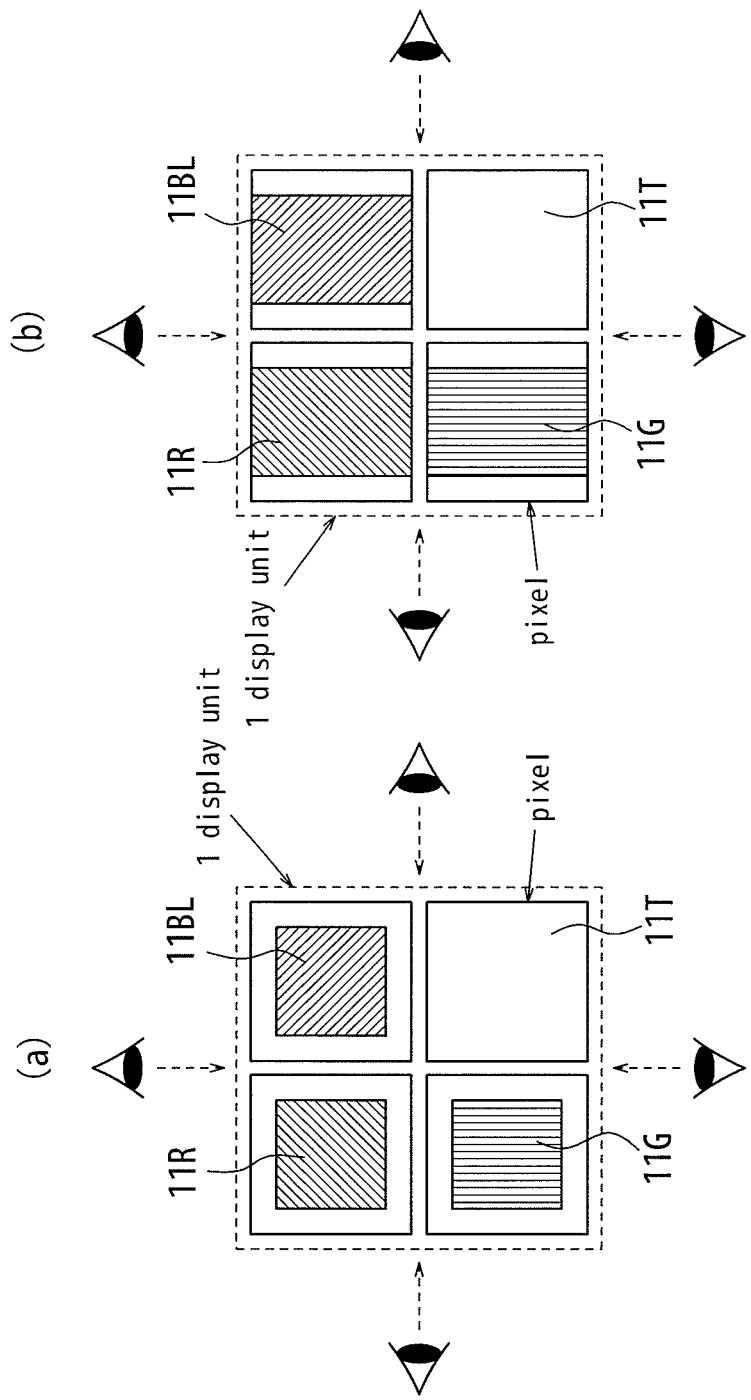
[FIG. 12]

Then, one embodiment of one display unit in the information display panel according to the invention having the construction mentioned above will be explained on the basis of FIGS. 10a and 10b to FIGS. 12a and 12b. If the color filters each having three primary colors for example the three color filters each having R, G or B colors are arranged respectively to one pixel, one display unit may be constructed by arranging R pixel, G pixel and B pixel in 1×3 matrix manner (examples shown in FIGS. 11a and 11b), and also one display unit may be constructed by arranging R pixel, G pixel, B pixel and a pixel to which no color filter is arranged (T pixel) in 1×4 or 2×2 matrix manner (examples shown in FIGS. 12a and 12b). When use is made of 1×3 or 1×4 matrix arrangement, the same color filter is arranged to the adjacent pixels along whichever one of right and left sides and up and down sides. Therefore, in this case, if the present invention is applied to the pixel along whichever one of right and left sides and up and down sides, to which the color filter having a different color is adjoined, it is possible to obtain the information display panel in which a color mixture is not recognized even when viewed from a tilt direction.

In the case such that one display unit may be constructed by arranging R pixel, G pixel, B pixel and a pixel to which no color filter is arranged (T pixel) in 2×2 matrix manner, if the present invention is applied to the pixel along both of right and left sides and up and down sides, to which the color filter having a different color is adjoined, it is possible to obtain the information display panel in which a color mixture is not recognized even when viewed from a tilt direction. If use is made of the color filter in which no interval t with respect to the pixels is arranged, it is possible to obtain the information display panel in which no color mixture with a color of the adjacent pixel is generated due to a size of the space DS between the pixels. However, in this case, if the interval t is arranged between the pixel and the color filer, the effect of the invention can be achieved more easily. In FIG. 12a, the interval mentioned above is arranged at both right and left sides and at both up and down sides of the color filter, and in FIG. 12b, the interval mentioned above is arranged at both right and left sides, but the interval mentioned above is not arranged at both up and down sides. In the information display panel shown in FIG. 12b, due to a size of the space DS between the pixels, there is a case such that a color mixture with the adjacent pixel is generated when viewed from tilt up and down direction. However, even in this case, if the present invention is applied, it is possible to obtain the information display panel in which no color mixture is recognized when viewed from either tilt directions.

Then, preferable embodiments of respective construction members constituting the information display panel according to the invention will be explained.

It is preferred to set a thickness of the transparent substrate at an observation side to not more than 200 µm. If the thickness exceeds 200 µm, there is sometimes a case such that it is difficult to achieve the information display panel according to the invention. Further, it is preferred to set a refractive index n of the transparent substrate at an observation side to not less than 1.47. If the refractive index is less than 1.47, there is sometimes a case such that it is difficult to achieve the information display panel according to the invention. In this case, as a material of the transparent substrate having a refractive index of not less than 1.47, use may be made of a glass having a refractive index of 1.49, a polyethylene terephthalate (PET) having a refractive index of 1.65, a polyethylene naphthalate (PEN) having a refractive index of 1.67, a triacetylcellulose (TAC) having a refractive index of 1.49, a polycarbonate (PC) having a refractive index of 1.63, a polyether sulfone (PES) having a refractive index of 1.68, an acryl base resin such as a polymethylmethacrylate (PMMA) having a refractive index of 1.49-1.55 and so on.

As a preferred embodiment of the information display panel according to the invention, there is a case such that three color filters constituted by R: red color, G: green color, B: blue color or by C: cyan color, M: magenta color, Y: yellow color are arranged respectively to respective pixels, one display unit is constructed by the three pixels, and 3×1 matrix arrangement is achieved, or, a case such that one display unit is constructed by four pixels constituted by these three color filters and one pixel to which no color filter is arranged, and 2×2 or 4×1 matrix arrangement is achieved.

In the information display panel according to the invention, the color filters are formed by a printing method or a photolithographic method, and then arranged to an outer surface of the transparent substrate at an observation side of the information display panel.

In the information display panel according to the invention, since the color filters are arranged at an outer side of the transparent substrate at an observation side, the color filters can be formed and arranged, at an outer side of the transparent substrate at an observation side, to not only the transparent substrate on which the conductive film (electrode) is formed but also the transparent substrate at an observation side which is a temporary body of the information display panel according to the invention, by using a printing method such as an ink jet printing and a flexographic printing, or a photolithography method.

When forming a partition wall portion arranged for maintaining a gap between two panel substrates of the information display panel or a partition wall portion arranged for forming cells in which the display media constituted by particles are accommodated, it is preferred to use a photolithography technique using a liquid resist or a dry-film resist. As one example, use is made of ALPHO NIT2 (produced by Nichigo-Morton Co., Ltd.) or PDF300 (produced by Nippon Steel Chemical Co., Ltd.) as the dry-film resist. The partition wall having a desired color can be formed by adding various pigments to these dry-film resists.

It is preferred to set a width of the partition wall portion for maintaining a gap between the panel substrates to a range of 20 μm-100 μm, which range does not exceed the space DS between the pixel and the pixel. Moreover, it is preferred to set a width of the partition wall portion for forming cells only to a range of 5 μm-30 μm, which range does not exceed the space DS between the pixel and the pixel.

In the conductive film constituting the pixel arranged oppositely to an information display region, as a material of the transparent conductive film arranged to the information display region of the transparent substrate at an observation side, use is made of transparent conductive metal oxides such as indium tin oxide (ITO), indium oxide, zinc-doped indium oxide (IZO), aluminum-doped zinc oxide (AZO), antimony tin oxide (ATO), conductive tin oxide, conductive zinc oxide and so on, or, transparent conductive polymers such as polyaniline, polypyrrole, polythiophene, poly (3,4-ethylenedioxythiophene)-poly-(styrenesulfonate) (PEDOT:PSS) and so on.

In the conductive film constituting the pixel arranged oppositely to an information display region, a material of the conductive film arranged to the information display region of the rear substrate may be transparent or may not be transparent, and use is made of conductive metal oxides such as indium tin oxide (ITO), indium oxide, zinc-doped indium oxide (IZO), aluminum-doped zinc oxide (AZO), antimony tin oxide (ATO), conductive tin oxide, conductive zinc oxide and so on, or, conductive polymers such as polyaniline, polypyrrole, polythiophene, poly (3,4-ethylenedioxythiophene)-poly-(styrenesulfonate) (PEDOT:PSS) and so on, or, metals such as gold, silver, copper, aluminum, nickel, chromium and so on or an alloy having these metals as a main ingredient.

As a method of forming a conductive film arranged to the substrate, use is made of a method in which the materials mentioned above are made to a thin film by means of sputtering method, vacuum vapor deposition method, CVD (chemical vapor deposition) method, coating method and so on, or, a method of laminating metal foils (for example rolled copper foil), or, a method in which conductive materials and solvents are mixed with synthetic resin binder and the mixture is sprayed to perform pattering. Additionally, the thickness of the conductive film arranged to the information display region of the transparent substrate at an observation side may be suitable unless the electro-conductivity is absent or any hindrance exists in optical transparency, and it is preferable to be 0.01 μm-10 μm, more preferable to be 0.05 μm-5 μm. Moreover, the thickness of the conductive film arranged to a portion other than the information display region or the conductive film arranged to the rear substrate may be suitable unless the electro-conductivity is absent, and it is preferable to be 0.01 μm-10 μm, more preferable to be 0.05 μm-5 μm.

The material of the transparent conductive material of metal oxides such as ITO, which is suitable as the conductive film arranged to the transparent substrate at an observation side, has a small flexibility as compared with a metal material. As the transparent conductive film of metal oxides arranged to the information display region of the transparent substrate at an observation side, it is preferred to arrange such a film together with a metal thin line so as to prevent a break in the transparent electrode. Especially, if use is made of a line-shaped transparent conductive film, it is more preferable to arrange such a line-shaped film together with a metal thin line so as to prevent a break in the transparent conductive film since the line-shaped transparent conductive film easily breaks. Since the display visibility does not hidden, it is preferred to set a width of the metal thin line to 1 μm-10 μm. Since the conductive film arranged to a portion other than the information display region or the conductive film arranged to the rear substrate does not need optical transparency, use is preferably made of the metal materials mentioned above which are low electric resistance and an excellent flexibility. Moreover, the thickness of the conductive film arranged to a portion other than the information display region of the substrate at an observation side or the conductive film arranged to the rear substrate is designed to be 0.01 μm-10 μm from a standpoint of electric resistance, productivity and cost.

EXAMPLES

Hereinafter, actual examples will be explained.

As to examples 1-12 and comparative examples 1-3 mentioned below, the information display panel is manufactured respectively on the basis of various conditions shown in Table 1. In this case, the display media used in the information display panel are as follows.

(Black Color Display Media)

3 parts by weight of nigrosine compound (Bontoron N07: product of Orient Chemical Industries, Ltd.) as a positive charge control agent, and, 5 parts by weight of carbon black (SPECIAL BLACK: production of Degussa) as black pigment were dispersed by a sand mill in 60 parts by weight of methyl methacrylate monomer (KANTO CHEMICAL's reagent) and 40 parts by weight (about 25 mol %) of ethylene glycol dimethacrylate (Wako Pure Chemical's reagent) as multifunctional monomer having a plurality of polymerization reactive groups in one molecule. Then, 5 parts by weight of (acrylic or methacrylic) resin-fluorocarbon resin block copolymer (MODIPER F600, manufactured by NOF CORPORATION) was dissolved therein. Then, 2 parts by weight of lauryl peroxide (PEROYL L, manufactured by NOF CORPORATION) was further dissolved therein to obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator. The product was filtered and dried. Then, a classifier (MDS-2: NIPPON PNEUMATIC MFG. CO., LTD.) was used to obtain positively charged black color particles having an average particle diameter of 9.2 μm. The black color particles thus obtained were used as the black display media.

(White Color Display Media)

100 parts by weight of polymethylpentene polymer (TPX-R18: manufactured by Mitsui Chemicals, Inc.), 100 parts by weight of titanium oxide (TIPAQUE CR-90, manufactured by ISHIHARA SANGYO KAISHA, LTD.) as a coloring agent and 5 parts by weight of phenolic condensate (Bontoron E89: produced by Orient Chemical Industries, Ltd.) as a negative charge control agent were subjected to biaxial kneading and crushed into pieces with a jet mill (Labo Jet Mill IDS-LJ model, manufactured by Nippon Pneumatic Mfg. Co., Ltd.). These pieces were classified by using a classifier (MDS-2: NIPPON PNEUMATIC MFG. CO., LTD.) and were subjected to a fusion spheroidizing by using a fusion spheroidizing apparatus (MR-10; NIPPON PNEUMATIC MFG. CO., LTD.) to obtain negatively charged white color particles having an average particle diameter of 9.5 μm. In the examples, the white color particles thus obtained were used as the white color media.

Two groups of the particles are arranged inn the cell between the substrates evenly to obtain a volume occupying rate of the two groups of the particles to be 25% so as to form the display media.

Moreover, with respect to the information display panels respectively according to examples 1-12 and comparative examples 1-3, interval t, DS, LS and visual field displacement I along 45° direction are measured, and a ratio between an area of the color filter and an area of the pixel is calculated, so that the measured data and the calculated data are shown in the following Table 1. Then, with respect to the thus obtained information display panel according to the examples 1-12 and the comparative examples 1-3, a visibility from a front direction is estimated and the estimated data is shown as an estimation result 1, and, a visibility from a 45° tile direction is estimated and the estimated data is shown as an estimation result 2 respectively.

Example 1

The color filter, in which four colors (R, G, BL, T) were arranged as 2×2, was manufactured in such a manner that: the partition walls (ribs) having a 1000 μm×1000 μm matrix-shaped opening portion and having a width of 20 μm for maintaining the substrate interval of 50 μm were formed on the ITO film having a thickness of 100 nm of the transparent glass substrate (thickness: 200 μm, refractive index: 1.47) with ITO film to which an electrode patterning was performed; and a material of the color filter was arranged by an ink-jet printing method to a central portion of a surface of the transparent glass substrate opposed to a surface on which the ITO film, which corresponded to a region surrounded by the partition walls, was formed. The color filter was arranged in such a manner that an interval of 100 μm with respect to a size of the pixel surrounded by the partition walls was maintained around respective color filters. In the ink-jet printing method, it was preferred to control a size of an ink drop in relation to a size of a region to which the target color filter was formed. Therefore, with respect to the 1000 μm×1000 μm matrix-shaped opening portion (pixel), use was made of the ink drop controlled to be 6-30 pico-liter so as to form the color filter having an area smaller than that of the pixel.

As a material of the color filter, use was made of a color filter material (ink) of light curing type. As an acrylic monomer, use was made of DCP-A (dimethylol cyclodecane diacrylate) of KYOEISHA CHEMICAL Co., Ltd. As a photo initiator, use was made of IRGACURE 184 of Chiba Specialty Chemical Inc.

In the example 1, the estimation result 1 which estimates a visibility from a front direction shows a clear and excellent display state. Moreover, the estimation result 2 which estimates a visibility from a 45° tilt direction shows a display state in which a color mixture is not recognized and thus it is estimated as excellent.

Example 2

The color filter, in which three color filters with red (R), blue (BL), green (G) colors were arranged with an interval of 35 μm at both portions with respect to the side having 150 μm width, was manufactured in such a manner that: the partition walls (ribs) having a 150 μm×300 μm matrix-shaped opening portion and having a width of 30 μm for maintaining the substrate interval of 50 μm were formed on the ITO film having a thickness of 100 nm of the transparent polyethylene terephthalate film (PET film) substrate (thickness: 120 μm, refractive index: 1.65) with ITO film to which an electrode patterning was performed; and a material of the color filter was arranged by a flexographic printing (anastatic printing) method as a line-shaped pattern having a width of 80 μm to a central portion of a surface opposed to a surface on which the ITO film, which corresponded to a region surrounded by the partition walls, was formed. As a light initiator for a flexographic ink, use was made of IRGACURE 184 of Chiba Specialty Chemical Inc. By using this flexographic ink, the stripe-shaped color filters were printed sequentially on the glass substrate. As an anilox roll for the flexographic printing, use was made of 500 lines and a film thickness was controlled to be 1.5 μm.

In the example 2, the estimation result 1 which estimates a visibility from a front direction shows a clear and excellent display state. Moreover, the estimation result 2 which estimates a visibility from a 45° tilt direction shows a display state in which a color mixture is not recognized and thus it is estimated as excellent.

Example 3

The partition walls (ribs) having a 500 μm×500 μm matrix-shaped opening portion and having a width of 50 μm for maintaining the substrate interval of 50 μm were formed on the ITO film having a thickness of 100 nm of the transparent glass substrate (thickness: 200 μm, refractive index: 1.47) with ITO film to which an electrode patterning was performed. Then, a surface of the color filter of the transparent polyethylene terephthalate film (PET film) having a thickness of 125 μm as the transparent protection layer to which the color filters were formed by a photolithography method was attached by using a transparent adhesion agent to a central portion of a surface of the transparent glass substrate opposed to a surface on which the ITO film, which corresponded to a region surrounded by the partition walls.

The color filter was manufactured in such a manner that the color filters were arranged to a central portion corresponding to the pixel formed by the ITO electrodes by: applying evenly a photo-resist of negative type, in which a pigment for the color filter is dispersed, to a surface of the transparent glass substrate, which was opposite to a surface to which the ITO film was formed so as to obtain a thickness of 2.0 μm, by means of a slit coater; exposing by using an exposing mask; and developing by using sodium carbonate aqueous solution. The color filters, in which four colors (R, G, BL, T) were arranged as 2×2, were sequentially manufactured. The color filter having an area smaller than that of the pixel surrounded by the partition walls was arranged. In this case, an interval between the pixel outermost portion and the color filter outermost portion was set to 60 μm.

In the example 3, the estimation result 1 which estimates a visibility from a front direction shows a clear and excellent display state. Moreover, the estimation result 2 which estimates a visibility from a 45° tilt direction shows a display state in which a color mixture is not recognized and thus it is estimated as excellent.

Example 4

The partition walls (ribs) having a 1000 μm×1000 μm matrix-shaped opening portion and having a width of 70 μm for maintaining the substrate interval of 50 μm were formed on the ITO film having a thickness of 100 nm of the transparent polyethylene terephthalate film (PET film) substrate (thickness: 125 μm, refractive index: 1.65) with ITO film to which an electrode patterning was performed, and the color filter was formed by a photolithography method to a central portion of a surface of the transparent glass substrate opposed to a surface on which the ITO film, which corresponded to a region surrounded by the partition walls, was formed. The color filters each having the substantially same size as that of the pixel were arranged to a central portion corresponding to the pixel formed by the ITO electrodes by: applying evenly a photo-resist of negative type, in which a pigment for the color filter is dispersed, to a surface of the transparent glass substrate, which was opposite to a surface to which the ITO film was formed so as to obtain a thickness of 2.0 μm, by means of a slit coater; exposing by using an exposing mask; and developing by using sodium carbonate aqueous solution. In the color filter, among four pixels arranged as 2×2, the color filters each having red, blue and green colors are sequentially applied to three pixels, and a transparent color filter T was applied to one pixel by not coating the photo-resist of negative type.

In the example 4, the estimation result 1 which estimates a visibility from a front direction shows a clear and excellent display state. Moreover, the estimation result 2 which estimates a visibility from a 45° tilt direction shows a display state in which a color mixture is not recognized and thus it is estimated as excellent.

Example 5

The color filter, in which four colors (red: R, green: G, blue: BL, transparent: T) were arranged as 2×2, was manufactured in such a manner that: the partition walls (ribs) having a 100 μm×100 μm matrix-shaped opening portion and having a width of 20 μm for maintaining the substrate interval of 50 μm were formed on the ITO film having a thickness of 100 nm of the transparent polyethylene terephthalate film (PET film) substrate (thickness: 125 μm, refractive index: 1.65) with ITO film to which an electrode patterning was performed, and a material of the color filter was arranged by an ink-jet printing method to a central portion of a surface of the transparent PET film substrate opposed to a surface on which the ITO film, which corresponded to a region surrounded by the partition walls, was formed. The color filter having the substantially same size as that of the pixel was arranged. In this case, an interval between the pixel outermost portion and the color filter outermost portion was few, and the color filter outermost portion does not exceed the pixel outermost portion. In the ink-jet printing method, it was preferred to control a size of an ink drop in relation to a size of a region to which the target color filter was formed. Therefore, with respect to the 100 μm×100 μm matrix-shaped opening portion (pixel), use was made of the ink drop controlled to be 6-30 pico-liter so as to form the color filter having an area smaller than that of the pixel.

As a material of the color filter, use was made of a color filter material (ink) of light curing type. As an acrylic monomer, use was made of DCP-A (dimethylol cyclodecane diacrylate) of KYOEISHA CHEMICAL Co., Ltd. As a photo initiator, use was made of IRGACURE 184 of Chiba Specialty Chemical Inc.

In the example 5, the estimation result 1 which estimates a visibility from a front direction shows a clear and excellent display state. Moreover, the estimation result 2 which estimates a visibility from a 45° tilt direction shows a display state in which a color mixture is not recognized and thus it is estimated as excellent.

Example 6

The color filter, in which four colors (red: R, green: G, blue: BL, transparent: T) were arranged as 2×2, was manufactured in such a manner that: the partition walls (ribs) having a 100 μm×100 μm matrix-shaped opening portion and having a width of 20 μm for maintaining the substrate interval of 50 μm were formed on the ITO film of the transparent polyethylene terephthalate film (PET film) substrate (thickness: 50 μm, refractive index: 1.65) with ITO film to which an electrode patterning was performed, and a material of the color filter was arranged by an ink-jet printing method to a central portion of a surface of the transparent PET film substrate opposed to a surface on which the ITO film, which corresponded to a region surrounded by the partition walls, was formed. An interval of 10 μm with respect to the pixel surrounded by the partition walls was arranged around respective color filters.

In the example 6, the estimation result 1 which estimates a visibility from a front direction shows a clear and excellent display state. Moreover, the estimation result 2 which estimates a visibility from a 45° tilt direction shows a display state in which a color mixture is not recognized and thus it is estimated as excellent.

Example 7

The color filter, in which four colors (red: R, green: G, blue: BL, transparent: T) were arranged as 2×2, was manufactured in such a manner that: the partition walls (ribs) having a 300 μm×300 μm matrix-shaped opening portion and having a width of 20 μm for maintaining the substrate interval of 50 μm were formed on the ITO film of the transparent polyethylene terephthalate film (PET film) substrate (thickness: 125 μm, refractive index: 1.65) with ITO film to which an electrode patterning was performed, and a material of the color filter was arranged by an ink-jet printing method to a central portion of a surface of the transparent PET film substrate opposed to a surface on which the ITO film, which corresponded to a region surrounded by the partition walls, was formed. An interval of 40 μm with respect to the pixel surrounded by the partition walls was arranged around respective color filters.

In the example 6, the estimation result 1 which estimates a visibility from a front direction shows a clear and excellent display state. Moreover, the estimation result 2 which estimates a visibility from a 45° tilt direction shows a display state in which a color mixture is not recognized and thus it is estimated as excellent.

Example 8

The color filter, in which three color filters with red (R), blue (BL), green (G) colors were arranged with an interval of 10 μm at both portions with respect to the side having 100 μm width, was manufactured in such a manner that: the partition walls (ribs) having a 100 μm×300 μm matrix-shaped opening portion and having a width of 20 μm for maintaining the substrate interval of 50 μm were formed on the ITO film having a thickness of 100 nm of the transparent PET film substrate (thickness: 50 μm, refractive index: 1.65) with ITO film to which an electrode patterning was performed; and a material of the color filter was arranged by a flexographic printing (anastatic printing) method as a line-shaped pattern having a width of 80 μm to a central portion of a surface opposed to a surface on which the ITO film, which corresponded to a region surrounded by the partition walls, was formed. As a light initiator for a flexographic ink, use was made of IRGACURE 184 of Chiba Specialty Chemical Inc. By using this flexographic ink, the stripe-shaped color filters were printed sequentially on the glass substrate. As an anilox roll for the flexographic printing, use was made of 500 lines and a film thickness was controlled to be 1.5 μm.

In the example 8, the estimation result 1 which estimates a visibility from a front direction shows a clear and excellent display state. Moreover, the estimation result 2 which estimates a visibility from a 45° tilt direction shows a display state in which a color mixture is not recognized and thus it is estimated as excellent.

Example 9

The color filter, in which four colors (red: R, green: G, blue: BL, transparent: T) were arranged as 2×2, was manufactured in such a manner that: the partition walls (ribs) having a 100 μm×100 μm matrix-shaped opening portion and having a width of 20 μm for maintaining the substrate interval of 50 μm were formed on the ITO film having a thickness of 100 nm of the transparent polyethylene terephthalate film (PET film) substrate (thickness: 50 μm, refractive index: 1.65) with ITO film to which an electrode patterning was performed, and a material of the color filter was arranged by an ink-jet printing method to a central portion of a surface of the transparent PET film substrate opposed to a surface on which the ITO film, which corresponded to a region surrounded by the partition walls, was formed. An interval of 10 μm with respect to the pixel surrounded by the partition walls was arranged around respective color filters.

In the example 9, the estimation result 1 which estimates a visibility from a front direction shows a clear and excellent display state. Moreover, the estimation result 2 which estimates a visibility from a 45° tilt direction shows a display state in which a color mixture is not recognized and thus it is estimated as excellent.

Example 10

The color filter, in which four colors (red: R, green: G, blue: BL, transparent: T) were arranged as 2×2, was manufactured in such a manner that: the partition walls (ribs) having a 500 μm×500 μm matrix-shaped opening portion and having a width of 70 μm for maintaining the substrate interval of 50 μm were formed on the ITO film having a thickness of 100 nm of the transparent glass substrate (thickness: 200 μm, refractive index: 1.47) with ITO film to which an electrode patterning was performed; another transparent glass substrate (thickness: 700 μm) with ITO film was laminated with the transparent glass substrate at an observation side on which the particles as the display media were arranged to form a panel construction; and a material of the color filter was arranged in a dotted manner by an ink-jet printing method to a central portion of a surface of the transparent glass substrate at an observation side of the panel construction (thickness: 200 μm) opposed to a surface on which the ITO film, which corresponded to a region surrounded by the partition walls, was formed. Respective color filters were arranged in a circular dotted shape having a diameter of 400 μm, and an interval of about 50 μm was arranged around the color filter with respect to the pixel.

In the example 10, the estimation result 1 which estimates a visibility from a front direction shows a clear and excellent display state. Moreover, the estimation result 2 which estimates a visibility from a 45° tilt direction shows a display state in which a color mixture is not recognized and thus it is estimated as excellent.

Example 11

The color filter, in which four colors (red: R, green: G, blue: BL, transparent: T) were arranged as 2×2, was manufactured in such a manner that: the partition walls (ribs) having a 200 μm×200 μm matrix-shaped opening portion and having a width of 20 μm for maintaining the substrate interval of 50 μm were formed on the TFT substrate formed by arranging a 200 μm×200 μm matrix-shaped pixels on the glass substrate; the transparent PET substrate (thickness: 50 μm, refractive index: 1.65) with solid ITO film having a thickness of 100 μm, on which no pattering was performed, at an observation side on which the particles as the display media, was laminated with the TFT substrate to form a panel construction; and a material of the color filter was arranged by an ink-jet printing method to a central portion of a surface of the transparent PET substrate (thickness: 50 μm) at an observation side of the panel construction opposed to a surface on which the ITO film, which corresponded to a region pixel electrodes formed on the rear TFT substrate, was formed. An interval of 10 μm with respect to the pixel surrounded by the partition walls was arranged around respective color filters.

In the example 11, the estimation result 1 which estimates a visibility from a front direction shows a clear and excellent display state. Moreover, the estimation result 2 which estimates a visibility from a 45° tilt direction shows a display state in which a color mixture is not recognized and thus it is estimated as excellent.

Example 12

The color filter was manufactured in such a manner that: the partition walls (ribs) having a 500 μm×500 μm matrix-shaped opening portion and having a width of 50 μm for maintaining the substrate interval of 50 μm were formed on the ITO film having a thickness of 100 nm of the transparent glass substrate (thickness: 200 μm, refractive index: 1.47) with ITO film to which an electrode patterning was performed; and a material of the color filter was arranged by an ink-jet printing method to a region corresponding to a central portion of the pixel on a surface of the transparent glass substrate opposed to a surface on which the ITO film was formed. There was a little interval between the color filter and the pixel, but the color filter having the substantially same size as that of the pixel was formed.

In the example 12, the estimation result 1 which estimates a visibility from a front direction shows a clear and excellent display state. Moreover, the estimation result 2 which estimates a visibility from a 45° tilt direction shows a display state in which a color mixture is little recognized but it is estimated as substantially no problem.

Comparative Example 1

The color filter, in which four colors (red: R, green: G, blue: BL, transparent: T) were arranged as 2×2, was manufactured in such a manner that: the partition walls (ribs) having a 500 μm×500 μm matrix-shaped opening portion and having a width of 50 μm for maintaining the substrate interval of 50 μm were formed on the ITO film having a thickness of 100 nm of the transparent glass substrate (thickness: 200 μm, refractive index: 1.47) with ITO film to which an electrode patterning was performed; and a material of the color filter was arranged by an ink-jet printing method to a central portion of a surface of the transparent glass substrate opposed to a surface on which the ITO film, which corresponded to a region surrounded by the partition walls, was formed. An interval of 60 μm with respect to the pixel surrounded by the partition walls was arranged around respective color filters. In the ink-jet printing method, it was preferred to control a size of an ink drop in relation to a size of a region to which the target color filter was formed. Therefore, with respect to the 500 μm×500 μm matrix-shaped opening portion (pixel), use was made of the ink drop controlled to be 6-30 pico-liter so as to form the color filter which does not exceed the pixel having a size of 100 μm×100 μm.

As a material of the color filter, use was made of a color filter material (ink) of light curing type. As an acrylic monomer, use was made of DCP-A (dimethylol cyclodecane diacrylate) of KYOEISHA CHEMICAL Co., Ltd. As a photo initiator, use was made of IRGACURE 184 of Chiba Specialty Chemical Inc.

In the comparative example 1, the estimation result 1 which estimates a visibility from a front direction shows a clear and excellent display state. In contrast, the estimation result 2 which estimates a visibility from a 45° tilt direction shows a display state in which a color mixture with the adjacent color is recognized and thus it is estimated as no good.

Comparative Example 2

The color filter was manufactured in such a manner that: the partition walls (ribs) having a 100 μm×100 μm matrix-shaped opening portion and having a width of 20 μm for maintaining the substrate interval of 50 μm were formed on the ITO film having a thickness of 100 nm of the transparent glass substrate (thickness: 200 μm, refractive index: 1.47) with ITO film to which an electrode patterning was performed; and a material of the color filter was arranged by an ink-jet printing method to a region corresponding to a central portion of the pixel on a surface of the transparent glass substrate opposed to a surface on which the ITO film was formed. The color filters were formed in such a manner that an interval of 10 μm between the color filter and the pixel was arranged.

In the comparative example 2, the estimation result 1 which estimates a visibility from a front direction shows a clear and excellent display state. In contrast, the estimation result 2 which estimates a visibility from a 45° tilt direction shows a display state in which a color mixture with the adjacent color is recognized and thus it is estimated as no good.

Comparative Example 3

The color filter was manufactured in such a manner that: the partition walls (ribs) having a 100 μm×100 μm matrix-shaped opening portion and having a width of 20 μm for maintaining the substrate interval of 50 μm were formed on the ITO film having a thickness of 100 nm of the transparent PET substrate (thickness: 200 μm, refractive index: 1.65) with ITO film to which an electrode patterning was performed; and a material of the color filter was arranged by an ink-jet printing method to a region corresponding to a central portion of the pixel on a surface of the transparent PET substrate opposed to a surface on which the ITO film was formed. An interval of 40 μm with respect to the pixel size surrounded by the partition walls was arranged around respective color filters.

In the comparative example 3, the estimation result 1 which estimates a visibility from a front direction shows a clear and excellent display state. In contrast, the estimation result 2 which estimates a visibility from a 45° tilt direction shows a display state in which a color mixture with the adjacent color is recognized and thus it is estimated as no good.
[Table 1]

From the results shown in Table 1, it is understood that the examples 1-12, in which an occupied area of the color filter with respect to an area of the pixel is not less than 50% and the visual field displacement I when observed from a 45° tile direction satisfies I≤0.5×(DS+LS), shows a clear and excellent display state as the estimation result 1 which estimates a visibility from a front direction and a display state in which a color mixture is not recognized as the estimation result 2 which estimates a visibility from a 45° tilt direction, as compared with the comparative examples 1-3, in which one of or both of the conditions mentioned above are not satisfied.

Industrial Applicability

The information display system according to the invention is preferably applicable to the display portion of the mobile equipment such as notebook personal computers, electric diary, PDAs (Personal Digital Assistants), cellular phones, handy terminals and so on; to the electric paper used as electric books, electric newspaper and so on; to the bulletin boards such as signboards, posters, blackboards (whiteboards) and so on; to the display portion of electric calculator, home electric goods, auto supply and so on; to the display portion of electric paper for point cards, IC cards, electric advertisements, information boards, electric POPs (Point Of Presence, Point Of Purchase advertising), electric price tags, electric shelf tags, electric musical score, RF-ID device and so on. In addition, the information display panel is preferably applicable to the display portion of various electric devices such as POS terminals, car navigation system, watch and so on. Further, the information display panel is preferably applicable to rewritable paper type electric paper (which can be re-written by using outer field generating device).

DESCRIPTIONS OF NUMERALS

1,2 substrate
3W white color display media
3Wa negatively charged white color particle
3B black color display media
3Ba positively charged black color particle
4 partition walls
5, 6 electrode
7 insulation liquid
8 capsule
11R red color filter
11G green color filter
11BL blue color filter
11T transparent color filter
12 adhesive agent
13 protection layer
21 transparent protection film
22 transparent adhesive layer

The invention claimed is:

1. An information display panel, in which display media are sealed in a space between the substrates wherein a transparent substrate at an observation side and a rear substrate which is not necessary to be transparent are disposed oppositely, and, in which the displayed color information can be identified through color filters each having respective colors arranged on the transparent substrate at the observation side by using a light incident from the observation side, which is reflected by the display media as a reflection light, characterized in that:

said color filters each having respective colors are arranged to an outer surface of a transparent substrate at an observation side having a refractive index n and a thickness d, in such a manner that an overlap area between the color filter and the pixel is set in a range of 50%-100% with respect to an area of the pixel, so that a portion between adjacent color filters having different colors, which is perpendicular to a tilt visual direction, is spaced at either one of an upper and lower sides and a right and left sides of the color filter; and a relation between a visual filed displacement I indicated by following formula (1), which is generated when the image displayed by the display media is viewed as a reflected light refracted at 45° with respect to a surface of the color filter, and LS and DS denoting a pixel pitch and a pixel space along a visual direction respectively, satisfies I≤0.5×(DS+LS);

$$I = d \times [\sin^2 \theta / (n^2 - \sin^2 \theta)]^{1/2} \quad \theta = 45° \qquad \text{formula (1)}.$$

2. The information display system according to claim 1, wherein a relation between the visual field displacement I indicated by said formula (1), which is generated when the image displayed by the display media is viewed as the reflected light refracted at 45° with respect to a surface of the color filter, and a space t generated between the color filter and the pixel, satisfies I≤DS+t.

3. The information display system according to claim 1, wherein a patterned transparent conductive layer or a solid transparent conductive layer is formed on one surface of the transparent substrate and the color filters having a respective color are arranged to a surface opposite to a surface on which said patterned or solid conductive film is formed.

4. The information display system according to claim 1, wherein a thickness d of the transparent substrate at the observation side is not more than 200 μm and a refractive index n of the transparent substrate at the observation side is not less than 1.47.

5. The information display system according to claim 1, wherein a material of the transparent substrate at the observation side is either one of glass, polyethylene terephthalate (PET), polyethylene naphthalate (PEN), triacetylcellulose (TAC), polycarbonate (PC), and acetyl group resin.

6. The information display system according to claim 1, wherein the color filters are constructed by either one of color filters having three primary colors or color filters having three primary colors and one transparent filter.

7. The information display system according to claim 1, wherein, as the display media sealed between the transparent substrate at the observation side on which the color filters are arranged and the other substrate at the rear side, use is made of particles including a particle having at least optical reflectance and charging characteristics so as to display image by moving the display media by means of an electric field formed between the substrates.

* * * * *